US010867585B2

(12) United States Patent
Lee et al.

(10) Patent No.: US 10,867,585 B2
(45) Date of Patent: Dec. 15, 2020

(54) ELECTRONIC APPARATUS AND METHOD FOR DISPLAYING A CONTENT SCREEN ON THE ELECTRONIC APPARATUS THEREOF

(71) Applicant: SAMSUNG ELECTRONICS CO., LTD., Suwon-si (KR)

(72) Inventors: Woong-ki Lee, Yongin-si (KR); Soo-hong Kim, Seoul (KR); Dae-bong Lee, Yongin-si (KR); Soo-hyun Whang, Seoul (KR); Young-mo Kang, Seoul (KR); Sang-min Kim, Namyangju-si (KR); Jong-ho Kim, Suwon-si (KR); Hyun-suk Kim, Seoul (KR); Chang-won Son, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/434,148

(22) Filed: Jun. 6, 2019

(65) Prior Publication Data

US 2019/0287490 A1 Sep. 19, 2019

Related U.S. Application Data

(63) Continuation of application No. 15/824,269, filed on Nov. 28, 2017, now Pat. No. 10,354,620.

(30) Foreign Application Priority Data

May 12, 2017 (KR) ........................ 10-2017-0059320
May 12, 2017 (KR) ........................ 10-2017-0059403
(Continued)

(51) Int. Cl.
*G09G 5/37* (2006.01)
*G09G 5/00* (2006.01)
(Continued)

(52) U.S. Cl.
CPC ............ *G09G 5/373* (2013.01); *G09G 5/003* (2013.01); *G09G 5/02* (2013.01); *G09G 5/10* (2013.01);
(Continued)

(58) Field of Classification Search
CPC combination set(s) only.
See application file for complete search history.

(56) References Cited

U.S. PATENT DOCUMENTS 9,424,804 B2 8/2016 Jung et al.
9,478,157 B2 10/2016 Wu et al.
(Continued)

FOREIGN PATENT DOCUMENTS

EP 2 299 723 A1 3/2011
JP 2009-37211 A 2/2009
(Continued)

OTHER PUBLICATIONS

Communicated dated Mar. 5, 2018 issued by the International Searching Authority in counterpart International Patent Application No. PCT/KR2017/013102 (PCT/ISA/210).
(Continued)

*Primary Examiner* — Wesner Sajous
(74) *Attorney, Agent, or Firm* — Sughrue Mion, PLLC

(57) ABSTRACT

An electronic apparatus and a controlling method thereof. The electronic apparatus includes a display; an outer frame to house the display; an illuminance sensor which detects a sensing value used to determine at least one of illuminance and color temperature of an external light; a memory which stores a background image, which is an image of an area behind the electronic apparatus; and a processor, which generates a content screen comprising an object layer including at least one graphic object and a background image layer including the background image. The display
(Continued)

displays the content screen and the processor may correct the background image or provide an image effect based on the sensed values.

20 Claims, 39 Drawing Sheets

(30) Foreign Application Priority Data

May 16, 2017 (KR) ........................ 10-2017-0060699
May 23, 2017 (KR) ........................ 10-2017-0063401

(51) Int. Cl.
*G09G 5/36* (2006.01)
*G09G 5/02* (2006.01)
*G09G 5/10* (2006.01)
*H04N 1/60* (2006.01)
*H04N 5/64* (2006.01)
*H04N 5/58* (2006.01)
*G09G 5/373* (2006.01)
*G09G 5/377* (2006.01)

(52) U.S. Cl.
CPC ............. *G09G 5/363* (2013.01); *G09G 5/377* (2013.01); *G09G 2320/0626* (2013.01); *G09G 2320/0653* (2013.01); *G09G 2320/0666* (2013.01); *G09G 2340/04* (2013.01); *G09G 2340/12* (2013.01); *G09G 2360/08* (2013.01); *G09G 2360/144* (2013.01)

(56) References Cited

U.S. PATENT DOCUMENTS

| | | | |
|---|---|---|---|
| 9,712,779 | B2 | 7/2017 | Yang et al. |
| 2006/0012715 | A1 | 1/2006 | Abe |
| 2006/0268363 | A1 | 11/2006 | Meinders |
| 2007/0126932 | A1 | 6/2007 | Bhat et al. |
| 2009/0033646 | A1 | 2/2009 | Liu et al. |
| 2009/0046106 | A1 | 2/2009 | Park et al. |
| 2009/0213272 | A1 | 8/2009 | Suzuki |
| 2009/0273660 | A1 | 11/2009 | Regen et al. |
| 2010/0079426 | A1 | 4/2010 | Ponce et al. |
| 2010/0201709 | A1 | 8/2010 | Yang et al. |
| 2011/0109628 | A1 | 5/2011 | Rurin |
| 2011/0310111 | A1 | 12/2011 | Cho et al. |
| 2012/0013646 | A1 | 1/2012 | Ichioka et al. |
| 2012/0039533 | A1 | 2/2012 | Han et al. |
| 2014/0168263 | A1 | 6/2014 | Avci et al. |
| 2015/0029196 | A1 | 1/2015 | Shida et al. |
| 2016/0225183 | A1 | 8/2016 | Lee et al. |
| 2016/0284316 | A1 | 9/2016 | Kestelli et al. |
| 2016/0293139 | A1 | 10/2016 | Kwon |
| 2016/0378311 | A1 | 12/2016 | Kim et al. |
| 2018/0095711 | A1* | 4/2018 | Kanda .................. H04L 65/403 |
| 2018/0164981 | A1* | 6/2018 | Park .................... G06F 3/04845 |

FOREIGN PATENT DOCUMENTS

| | | | |
|---|---|---|---|
| JP | 2009-206613 | A | 9/2009 |
| JP | 2011-13515 | A | 1/2011 |
| JP | 2011-48196 | A | 3/2011 |
| JP | 2011-59543 | A | 3/2011 |
| JP | 5062632 | B2 | 10/2012 |
| KR | 10-2008-0109964 | A | 12/2008 |
| KR | 10-2011-0025216 | A | 3/2011 |
| KR | 10-2012-0057692 | A | 6/2012 |
| KR | 10-2014-0042578 | A | 4/2014 |
| KR | 10-1411324 | B1 | 6/2014 |
| KR | 10-2014-0085755 | A | 7/2014 |
| KR | 10-2014-0094161 | A | 7/2014 |
| KR | 10-1476291 | B1 | 12/2014 |
| KR | 10-2015-0057039 | A | 5/2015 |
| KR | 10-1547556 | B1 | 8/2015 |
| KR | 10-2015-0101705 | A | 9/2015 |
| KR | 10-1639392 | B1 | 7/2016 |
| KR | 10-2016-0116576 | A | 10/2016 |
| KR | 10-1680672 | B1 | 11/2016 |
| KR | 10-1693384 | B1 | 1/2017 |

OTHER PUBLICATIONS

Communication dated Mar. 5, 2018 issued by the International Searching Authority in counterpart International Patent Application No. PCT/KR2017/013102 (PCT/ISA/237).
Communication dated Nov. 6, 2019, issued by the European Patent Office in counterpart European Application No. 17909123.6.
Communication dated Jul. 24, 2020 issued by the European Intellectual Property Office in counterpart European Application No. 17 909 123.6.

* cited by examiner

ELECTRONIC APPARATUS AND METHOD FOR DISPLAYING A CONTENT SCREEN ON THE ELECTRONIC APPARATUS THEREOF

CROSS-REFERENCE TO RELATED APPLICATIONS

This a Continuation of U.S. application Ser. No. 15/824,269, filed Nov. 28, 2017, which claims priority from Korean Patent Application Nos. 10-2017-0063401, filed on May 23, 2017, 10-2017-0060699 filed on May 16, 2017, 10-2017-0059320 filed on May 12, 2017, and 10-2017-0059403 filed on May 12, 2017, in the Korean Intellectual Property Office, the disclosures of each of which are incorporated by reference herein in their entireties.

BACKGROUND

1. Field

Apparatuses and methods consistent with exemplary embodiments broadly relate to an electronic apparatus and a displaying method thereof, and more particularly, to an electronic apparatus which processes a content screen including a background image behind an electronic apparatus and a graphic object according to information of illuminance sensed from an illuminance sensor and a controlling method thereof.

2. Description of the Related Art

Recently, functions for providing various user experiences using an electronic apparatus have been developed. By way of example, as shown in FIG. 1, an electronic apparatus 100 may display its background image corresponding to a background area behind the electronic apparatus, thereby providing the user with a visual effect, such as viewing a transparent window. The background image may be implemented as a live feed which is acquired by a camera disposed rearward on a rear surface of the electronic apparatus 100, or may be implemented as a still image or a moving image already stored in the electronic apparatus 100.

Furthermore, the electronic apparatus 100 can display various graphic objects together with a background image. This allows the electronic apparatus 100 to provide an aesthetic effect to a user. At this time, the electronic apparatus 100 can not only display a background image but also can reproduce various content images.

However, there is a need to process a background image provided by the electronic apparatus 100 in accordance with natural light around the electronic apparatus 100 in order to provide a visual effect such that the electronic apparatus 100 becomes a transparent glass window.

SUMMARY

An aspect of exemplary embodiments provides an electronic apparatus which provides an image effect corresponding to natural light on a content screen including a background image by sensing natural light around an electronic apparatus and a controlling method thereof.

Another aspect of exemplary embodiments provides an electronic apparatus which adjusts brightness of a content screen to provide light adaptation effect according to a change in illuminance information of external light by sensing external light around an electronic apparatus and a displaying method thereof.

Still another aspect of exemplary embodiments provides an electronic apparatus which is capable of correcting color temperature and brightness on an area-by-area basis by sensing external light which is incident on an electronic apparatus at a plurality of areas and a displaying method thereof.

Still another aspect of exemplary embodiments is to provide an image processing apparatus and method for generating a content screen including an image received from an external source and a background image of a back side of an electronic apparatus, sensing external light incident on the electronic apparatus, and a controlling method thereof.

According to an exemplary embodiment, an electronic apparatus includes an illuminance sensor which obtains a sensing value to determine at least one of illuminance and color temperature of external light; a memory which stores a background image of the electronic apparatus; and a processor generates a content screen comprising an object layer including at least one graphic object and a background image layer including the background image behind and displays the content screen in the display, and the processor obtains an illuminance value of the external light through the obtained sensing value and adds an image effect corresponding to the illuminance value on the content screen.

Further, a method of controlling an electronic apparatus according to an embodiment includes: storing a background image of the electronic apparatus; providing a content screen including an object layer including at least one graphic object and a background image layer including the background image; obtaining an illuminance value of external light around the electronic apparatus through an illuminance sensor; and providing an image effect corresponding to the illuminance value on the content screen.

Also, according to an exemplary embodiment, an electronic apparatus includes: a display; at least one illuminance sensor; a memory for storing a background image of the electronic apparatus; and a processor for displaying a content screen on the display, the content screen including an object layer including at least one graphic object and a background image layer including the background image, and the brightness of the content screen can be increased and then reduced it again.

Also, according to an exemplary embodiment, a display method of an electronic apparatus includes: storing a background image of the electronic apparatus; providing a content screen including an object layer with at least one graphic object and a background image layer with the background image; obtaining an illuminance value around the electronic apparatus through at least one illuminance sensor; and increasing the brightness of the content screen when the brightness of the content screen is detected by the at least one brightness sensor and then decreasing the brightness again.

Also, according to an exemplary embodiment, an electronic apparatus includes: a display; an outer frame which houses the display; a first illuminance sensor and a third illuminance sensor which are symmetrically arranged on a left side and a right side of the outer frame and a second illuminance sensor arranged on or in the upper side of the outer frame between the first illuminance sensor and a third illuminance sensor; a memory which stores a background image of the electronic apparatus; and a processor which generates a content screen including an object layer with at least one graphic object and a background image layer with the background image and controls the display to display the content screen. The processor may obtain color temperature information and brightness information of the external light incident on a multiple areas of the outer frame through each of the first to third illuminance sensors and correct color temperature and brightness of the content screen on an area-by-area basis based on the color temperature information and brightness information.

Further, a display method of an electronic apparatus, according to an exemplary embodiment, includes: storing a background image of the electronic apparatus; generating a content screen including an object layer including at least one graphic object and a background image layer including the background image; obtaining color temperature information and brightness information of each of external light incident on a plurality of areas of the outer frame through each of a first illuminance sensor and a third illuminance sensor which are symmetrically arranged at a left side and a right side of the outer frame and a second illuminance sensor disposed on the upper side of the outer frame between the first illuminance sensor and a third illuminance sensor; correcting color temperature and brightness of the content screen for each area based on the respective color temperature information and brightness information; and displaying the content screen having the color temperature and the brightness corrected for each area.

Further, an electronic apparatus according to an exemplary embodiment includes a video receiver, a memory storing a background image of the electronic apparatus, and a processor which generates a content screen comprising a first layer including an image received through an external source and a second layer including a background image. The processor processes the transparency of the first layer to a first transparency and the transparency of the second layer to a second transparency that is different from the first transparency.

Further, a method of controlling an electronic apparatus according to an exemplary embodiment includes: processing a transparency of a first layer including an image received from an external source into a first transparency; processing the transparency of the second layer to a second transparency different from the first transparency, and generating a content screen including the first layer and the second layer.

According to various exemplary embodiments as described above, an electronic apparatus can provide a more realistic user experience as if a user sees a real glass window by providing a corrected background image and/or providing an image effect from an external light.

BRIEF DESCRIPTION OF THE DRAWINGS

The above and/or other aspects will become more apparent and more readily appreciated from the following description of exemplary embodiments with reference to the accompanying drawings. Understanding that these drawings depict only exemplary embodiments and are not therefore to be considered to be limiting of the scope of the disclosure, the principles herein are described and explained with additional specificity and detail through the use of the accompanying drawings, in which.

DETAILED DESCRIPTION OF THE EXEMPLARY EMBODIMENTS

Figure 1:
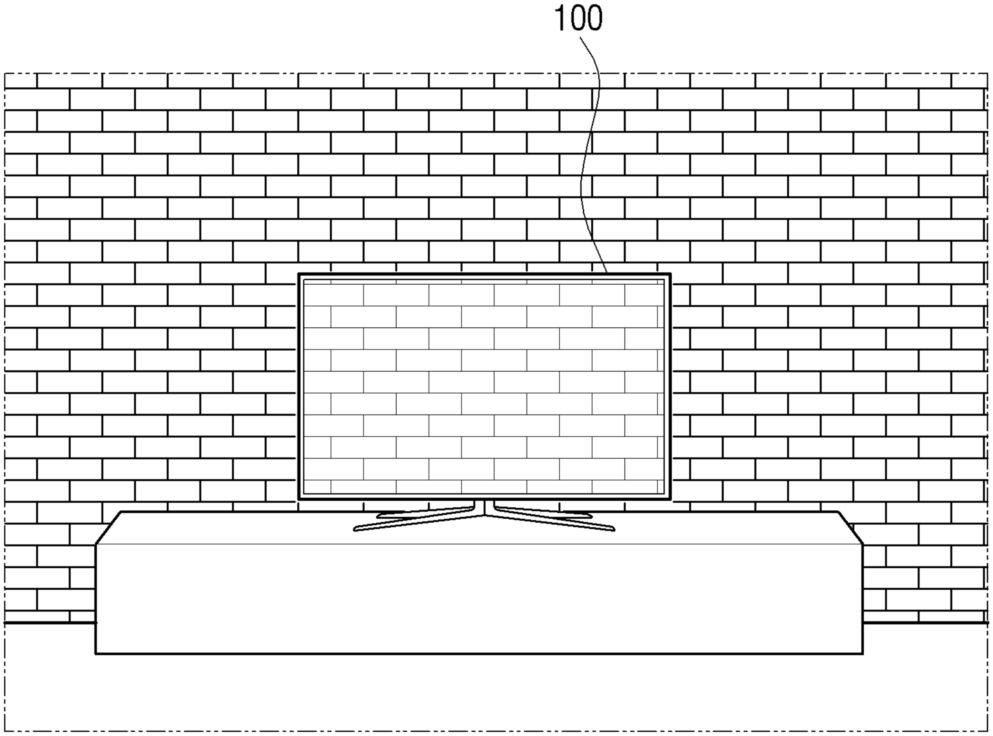
FIG. 1 (RELATED ART)
FIG. 1 is a view illustrating an image effect as if a display becomes a transparent glass window according to an exemplary embodiment.

Hereinafter, exemplary embodiments will be described in more detail with reference to the accompanying drawings.

In the following description, the same reference numerals are used for the same elements, even in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure exemplary embodiments with unnecessary detail.

The terms used herein are selected from the general terms that are widely used at present and in consideration of the functions in exemplary embodiments, but at the same time, the terms may vary depending on the intent of those skilled in the art or the precedents, or by the emergence of new technologies. Further, certain terms may be arbitrarily chosen, in which case the corresponding meaning will be described in detail in the disclosure. Accordingly, the terms used herein will be defined not simply based on the names of the terms, but based on the meanings of the terms and the context throughout the description.

Exemplary embodiments may have a variety of modifications and several examples. Accordingly, while various exemplary embodiments are described in detail herein, these are not intended to limit the scope of the present disclosure to exemplary embodiments only. Rather, it should be understood that exemplary embodiments encompass all the modifications, equivalents or replacements that fall under the concept and technology scope as disclosed. In describing exemplary embodiments, well-known functions or constructions may not be described in detail when they obscure the disclosure with unnecessary detail. Further, the terms described below are those that are defined in consideration of the functions of exemplary embodiments and may be varied according to users, operators or practices. Accordingly, definitions will have to be made based on the content provided throughout the description.

The terms such as "first." "second." and so on may be used to describe a variety of elements, but the elements should not be limited by these terms. The terms are used only for the purpose of distinguishing one element from another.

A singular expression includes a plural expression, unless otherwise specified. It is to be understood that the terms such as "comprise" or "consist of" are used herein to designate a presence of characteristic, number, step, operation, element, component, or a combination thereof, and not to preclude a presence or a possibility of adding one or more of other characteristics, numbers, steps, operations, elements, components or a combination thereof.

In exemplary embodiments, a 'module' or a 'unit' may perform at least one function or operation, and be implemented as hardware (e.g., circuitry) or software, or as a combination of hardware and software. Further, except for the 'module' or the 'unit' that has to be implemented as particular hardware (e.g., a dedicated processor), a plurality of 'modules' or a plurality of 'units' may be integrated into at least one module and implemented as at least one processor (not illustrated).

Meanwhile, exemplary embodiment describes a method of displaying various content screens including a display, but is not limited thereto. That is, the electronic apparatus 100 may be configured as a set top-box or an over the top device (OTT device). In this case, the electronic apparatus 100 may transmit an image signal to an external electronic apparatus, and the external electronic apparatus receiving the image signal may display various content screens. Although exemplary embodiments describe the electronic apparatus 100 as including a display for convenience and understanding of the description, even when the electronic apparatus 100 does not include a display, as described above, the technical concept of exemplary embodiments can be applied.

Hereinbelow, exemplary embodiments will be described in greater detail with reference to the drawings.

The electronic apparatus 100 according to an exemplary embodiment has a plurality of operation modes. A first operation mode (for example, a normal mode or a content mode) is a mode for displaying a general content image (for example, a broadcast content image). Specifically, the first operation mode is a mode for displaying the content prestored in the electronic apparatus 100 or the broadcast content received from the outside using the full screen of the electronic apparatus 100.

The second operation mode (for example, a background mode) is a mode in which the electronic apparatus 100 displays a content screen including a background image corresponding to a background area behind the electronic apparatus so as to provide a visual effect as if the electronic apparatus 100 is a glass window. Here, the content screen includes a background area, and may include at least one object and a shadow of at least one object.

In the second operation mode, the electronic apparatus 100 displays a background area behind the electronic apparatus 100 as a background image and thus, a user may confuse the electronic apparatus with a transparent glass window. That is, to a user, the electronic apparatus 100 may look like a transparent glass window.

In the meantime, in the second operation mode, not only the background screen but also specific graphic objects can be displayed together. According to an exemplary embodiment, the specific graphic object may be a clock object, but various graphic objects (e.g., pictures, photographs, fish tanks, memos, etc.) may be displayed if they can be attached to a common wall.

On the other hand, when the electronic apparatus 100 operates in the second operation mode, that is, when the content screen including the background image is displayed, the difference in brightness between the actual background area and the background image displayed on the electronic apparatus 100 needs to differ as little as possible, so that a user will not to detect the heterogeneity between the electronic apparatus 100 and the actual background area.

Therefore, according to a change in the surrounding environment of the electronic apparatus 100, the content screen including the background image displayed in the electronic apparatus 100 needs to be changed adaptively in exemplary embodiments.

Accordingly, the electronic apparatus 100 according to an exemplary embodiment senses surrounding environment (for example, external light, etc.), processes the content screen displayed in the electronic apparatus 100 according to the sensed surrounding environment, and displays the content screen.

Hereinbelow, the above operations are described in further detail according to various exemplary embodiments.

Figure 2:
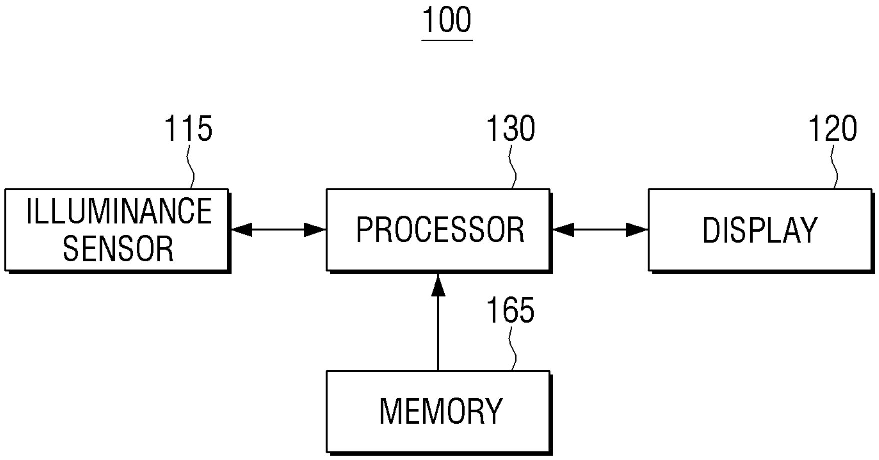
FIG. 2 is a block diagram illustrating a configuration of an electronic apparatus according to an exemplary embodiment.

FIG. 2 is a block diagram illustrating an electronic apparatus 100 according to an exemplary embodiment. As illustrated in FIG. 2, the electronic apparatus 100 includes an illuminance sensor 115, a display 120, a memory 165, and a processor 130.

The illuminance sensor 115 acquires sensing data for sensing the color temperature and illuminance of the external light projected from the external light source. At this time, a plurality of illuminance sensors 115 may be disposed in a plurality of areas of the outer frame of the electronic apparatus 100 to sense the direction in which the external light is incident, the type of light and the illuminance of each area. In a case where a plurality of illuminance sensors are provided, the plurality of illuminance sensors may include a first illuminance sensor disposed in a left outer frame i.e., positioned or placed in a left outer frame, a second illuminance sensor disposed in an upper outer frame i.e., positioned or placed in an upper outer frame, and a third illuminance sensor disposed in a right outer frame i.e., positioned or placed in a right outer frame, from among outer frames. This configuration of the sensors is provided by way of an example only and not by way of a limitation.

The display 120 displays image data. In particular, the display 120 may display image content obtained from an external source (e.g., a broadcast station, a server, a DVD, etc.) while the electronic apparatus 100 is operating in the first operation mode. In addition, the display 120 may display a content screen including a pre-stored background image while being operated in the second operation mode. At this time, the content screen may include at least one graphic object on the background image and a shadow for at least one graphic object. Also, the display 120 may adjust the brightness of the content screen or provide an image effect to the content screen based on the sensed data sensed by the illuminance sensor 115. At this time, the image effect may be to provide a new UI element (e.g., a flare image, a rainbow image, etc.) on an existing content screen.

The memory 165 may store programs and data for controlling the electronic apparatus 100. In particular, the memory 165 may store data for a background image corresponding to a background area behind the electronic apparatus 100. At this time, data for the background image may be obtained from an external device (e.g., a smart phone, etc.), but this is only by way of an example and not by way of a limitation, and data may be obtained from a camera connected to the electronic apparatus 100.

The processor 130 controls the overall operation of the electronic apparatus 100. In particular, the processor 130 may generate a content screen based on the data of the background image stored in the memory 165 and the data of the graphic object during the operation in the second operation mode, and display the content screen on the display 120. At this time, the content screen may include at least one graphical object on the background image and a shadow corresponding to at least one graphic object. At least one of the position and the shade of the shadow may be changed corresponding to a change of data sensed by the illuminance sensor 115.

In addition, when a bezel and an outer frame covering the bezel are included at edges of the electronic apparatus 100, the processor 130 may further display, on the display 120, shadow of the outer frame at an area corresponding to the outer frame at the edges of the content screen.

At this time, the processor 130 may generate an object layer including at least one graphic object, a shadow layer including a shadow, and a background image layer including a background image to create a content screen. At this time, the object layer may be obtained from the outside or generated from the pre-stored data, the shadow layer may be generated based on the object layer and the sensing data, and the background image layer may be generated from data on the background image stored in the memory 165. According to an exemplary embodiment, a plurality of object layers or background image layers may be generated. In addition, an outer frame shadow layer containing an outer frame shadow may be further generated.

In particular, the processor 130 may control so that the object layer, the shadow layer, and the background layer, are disposed and displayed in an order on the display 120. In addition, when the outer frame shadow layer is generated, the processor 130 may control so that the outer frame shadow layer is disposed ahead of the object layer and displayed on the display 120.

In addition, the processor 130 may perform image correction of at least one graphic object included in the content screen according to light intensity sensed by at least one sensor 110. For example, the processor 130 may adjust brightness of the at least one graphic object according to light intensity of external light.

In addition, when a plurality of graphic objects are included in the content screen, the processor 130 may perform different image correction for the plurality of graphic objects according to the types of the plurality of graphic objects. For example, the processor 130 may set the amount of brightness adjustment of a graphic object of a first type (e.g., a clock, etc.) and the amount of brightness adjustment of a graphic object of the second type (e.g., a fishbowl) differently according to light intensity of external light, according to an exemplary embodiment.

In addition, the processor 130 may perform image correction with respect to a background image included in a content screen according to at least one of a direction and light intensity of external light which is sensed by at least one sensor 110. For example, the processor 130 can darken the brightness of the background image as the light intensity of the external light becomes darker.

In addition, the processor 130 can generate shadows based on whether a background image is patterned or not. For example, if there is no pattern in the background image, the processor 130 brightens the brightness of the shadow, and if there is a pattern in the background image, the processor 130 may darken the brightness of the shadow.

According to an exemplary embodiment, when the illuminance value which is greater than or equal to a preset value is sensed through the at least one illuminance sensor 115, the processor 130 may generate a content screen including an image effect corresponding to the illuminance value.

Specifically, the processor 130 may determine the ultraviolet light value of the external light based on the data obtained through the at least one illuminance sensor 115, and determine whether the external light is sunlight based on the determination result. If the type of external light is determined to be the sunlight from the data obtained through the illuminance sensor 115 and the illuminance value is equal to or greater than a predetermined value, the processor 130 may determine the flare effect or the rainbow effect as the image effect, and generate a content screen that contains the flare or the rainbow effect.

At this time, the processor 130 may generate an image effect layer including an image effect which corresponds to the illuminance value and generate a content screen including an image effect layer, an object layer, and a background image layer.

In addition, the processor 130 may add an image effect corresponding to the illuminance value to the object layer and generate a content screen including an object layer having an image effect added thereto and a background image layer.

When there are a plurality of illuminance sensors 115, the processor 130 may determine the direction of the external light based on the data obtained through the plurality of illuminance sensors, and decide the shape and the position of the image effect. In addition, the processor 130 may adjust the size and brightness of the image effect to correspond to a change in the illuminance value.

By providing the image effect (for example, a flare effect, a rainbow effect, etc.) according to the external light in an exemplary embodiment as described above, the electronic apparatus 100 can make a content screen including a background image appear as a real glass window.

According to another exemplary embodiment, when a change in an illuminance value over a preset value is detected through at least one illuminance sensor 115, the processor 130 may control the electronic apparatus 100 so as to increase the brightness of the content screen and then decrease it again. That is, when the outside suddenly becomes bright, the processor 130 can provide a light adaptation effect. The light adaptation effect is the effect that, when the light suddenly brightens in a dark environment, a person cannot see due to dazzling light but can gradually see as the person gets adapted to the changed environment.

Specifically, according to an exemplary embodiment, while or during the content screen being displayed with the first brightness, a change in the illuminance value greater than or equal to a preset value may be detected. As a result, the processor 130 may control the electronic apparatus 100 to increase the brightness of the content screen from the first brightness to the second brightness, and then decrease it back to the first brightness. At this time, the second brightness, which is the maximum brightness value, may correspond to the change in the sensed illuminance value, according to an exemplary embodiment.

In addition, the processor 130 may increase the brightness of the content screen by adjusting the pixel brightness values of the background image layer and the object layer included in the content screen, and then decrease the brightness again. That is, the processor 130 can adjust the brightness of the content screen through image processing.

In addition, the processor 130 may increase the brightness of the content screen by adjusting the dimming value of the backlight included in the display 120, and then decrease again the brightness of the content screen.

When the processor 130 detects a change in an illuminance value less than a predetermined value through the at least one illuminance sensor 115, the processor 130 may adjust the brightness of the content screen to correspond to the change in the illuminance value of the sensed external light.

In addition, when the illuminance value of the external light is maintained for a preset time, and the change in illuminance value is detected over a predetermined value, the processor 130 may control the electronic apparatus 100 to increase the brightness of the content screen and then decrease the brightness again.

When there are a plurality of illuminance sensors 115, the processor 130 may control the electronic apparatus 100 to determine the direction of the external light based on the data obtained through the plurality of illuminance sensors, and increase brightness of an area corresponding to the determined direction of the external light from among the content screen and then decrease brightness again.

According to an exemplary embodiment, the electronic apparatus 100 may provide the image effect (for example, light adaptation effect, etc.) according to a change in illuminance value of the external light so that a content screen including a background image can be felt or perceived similar to an actual glass window.

According to another exemplary embodiment, the processor 130 may obtain color temperature information and brightness information of an external light incident on a plurality of areas through each of the plurality of illuminance sensors, and correct color temperature and brightness of the screen by areas based on the temperature information and the brightness information of each of the plurality of areas. At this time, the plurality of illuminance sensors may include a first illuminance sensor and a third illuminance sensor arranged symmetrically with respect to the outer frame, and a second illuminance sensor disposed or positioned at an upper part of the outer frame between the first illuminance sensor and the third illuminance sensor.

Specifically, according to an exemplary embodiment, the processor 130 may obtain the color temperature information of the XYZ domain from each of the plurality of illuminance sensors, convert the color temperature information of the XYZ domain obtained from each of the plurality of illuminance sensors into the RGB domain, obtain a gain value for correcting the color temperature of a pixel constituting the content screen based on the position of the illuminance sensors and the color temperature information converted into the RGB domain, and calibrate the color temperature value of the content screen based on the obtained gain value.

Also, the processor 130 may obtain brightness information from each of the plurality of illuminance sensors, obtain the reflectance of an object located behind the electronic apparatus, and correct the brightness of the content screen by areas based on the plurality of illuminance sensor positions, brightness information, and reflectance of an object.

At this time, in order to correct the brightness of the content screen by areas, the processor 130 may adjust brightness values of pixels constituting the content screen area by areas to correct the brightness of the content screen by areas or correct the brightness of the content screen by adjusting the dimming of the backlight included in the display 120 by areas.

According to an exemplary embodiment, by providing different corrections for each area according to the external light incident on a plurality of areas of the display 120, the electronic apparatus 100 may make the content screen including the background image appear as a real glass window.

Figure 3A:
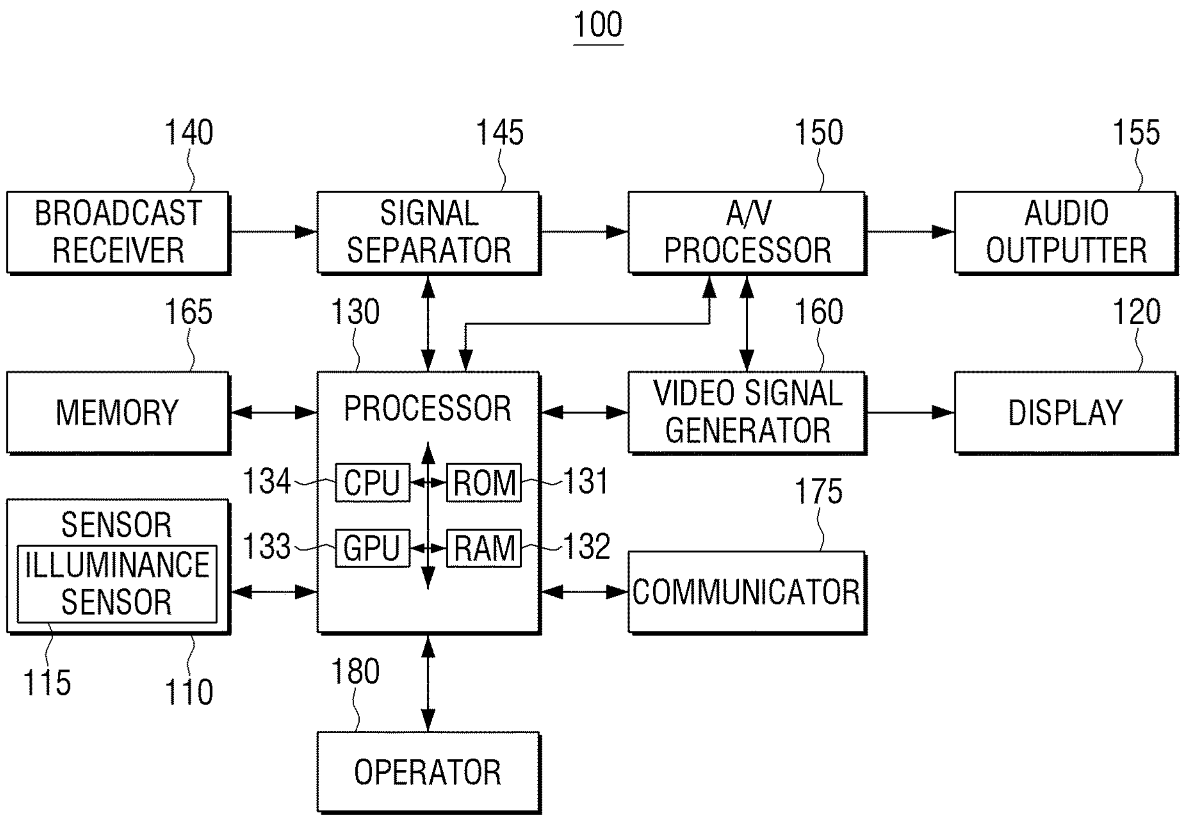
FIGS. 3A and 3B are block diagrams illustrating a more detailed configuration of an electronic apparatus according to an exemplary embodiment.

FIG. 3A is a block diagram illustrating a more detailed configuration of an electronic apparatus according to an exemplary embodiment. Referring to the FIG. 3A, the electronic apparatus 100 according to an exemplary embodiment includes a sensor 110, a display 120, a processor 130, a broadcast receiver 140, a signal separator 145, an audio and video (A/V) processor 150, an audio outputter 155, a video signal generator 160, a memory 165, a communicator 175, and an operator 180.

The sensor 110 may sense various environments and/or environmental factors around the display 120. In particular, according to an exemplary embodiment, the sensor 110 may include the illuminance sensor 115, as shown in FIG. 3A. At this time, the illuminance sensor 115 may generate sensing data for at least one of the type and the illuminance intensity of the external light projected from the external light around the display 120 to the display 120.

At this time, according to an exemplary embodiment, the illuminance sensor 115 can generate sensing data for obtaining color temperature information of an external light and illuminance information of the external light. At this time, according to an exemplary embodiment, the illuminance sensor 115 may be implemented as a single sensor to obtain sensed data on or about the degree of color temperature of the external light and the illuminance information, but this is merely provided by way of an example and not by way of a limitation, and can also be implemented as a color sensor for sensing color temperature information and an illuminance sensor for sensing illuminance information.

Figure 3B:
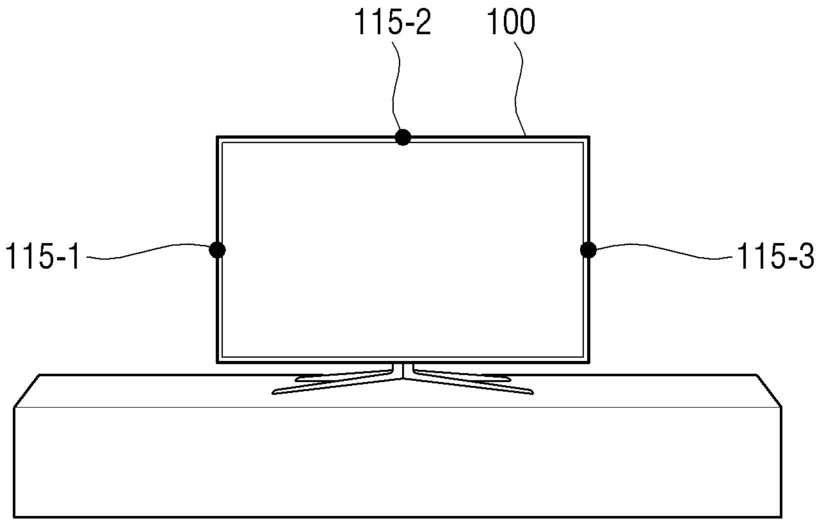

In particular, the illuminance sensor 115 includes a plurality of illuminance sensors disposed or positioned at mutually spaced positions on the electronic apparatus 100. To be specific, according to an exemplary embodiment illustrated in FIG. 3B, the illuminance sensor 115 may include a first illuminance sensor 115-1 disposed or positioned in the right outer frame, a second illuminance sensor 115-2 disposed or positioned in the upper outer frame, and a third illuminance sensor 115-3 disposed or positioned in the left outer frame. However, at the time of implementation, the illuminance sensor 115 may comprise two sensors, or may comprise four or more. The illuminance sensors 115-1 to 115-3 may be embedded in the outer frame of the electronic apparatus 120 so as not to be affected by the light emitted from the display 120. When at least one sensor 110 comprises two sensors, it may comprise one illuminance sensor and one color sensor, or two illuminance sensors or two color sensors. These variations are provided by way of an example only and not by way of a limitation.

In addition, the sensor 110 may further include various sensors such as an IR sensor, an ultrasonic sensor, an RF sensor, and the like. At this time, the sensor 110 may detect the position of an external user or object through various sensors.

The display 120 displays an image. According to various exemplary embodiments, the display 120 may be implemented as various types of displays such as a liquid crystal display (LCD), a plasma display panel (PDP), and the like. The display 120 may also include a driving circuit, a backlight unit, and the like, which may be implemented in the form of an a-si TFT, a low temperature poly silicon (LTPS) TFT, an organic TFT (OTFT). Meanwhile, the display 120 may be implemented as a touch screen in combination with the touch sensor. These are provided by way of an example and not by way of a limitation.

The display 120 includes a backlight. According to an exemplary embodiment, the backlight is point light sources which supports local dimming.

According to an exemplary embodiment, the light source constituting the backlight may be composed of a cold cathode fluorescent lamp (CCFL) or a light emitting diode (LED). Hereinafter, the backlight is illustrated as being composed of a light emitting diode and a light emitting diode driving circuit, but may be implemented as other configurations than the LED. The plurality of light sources constituting the backlight may be arranged in various forms, and various local dimming techniques may be applied. For example, the backlight may be a direct type backlight in which a plurality of light sources are arranged in a matrix form and are uniformly arranged over the entire liquid crystal screen. In this case, the backlight can operate with full-array local dimming or direct local dimming. Here, the full-array local dimming is a dimming method in which the light source is uniformly disposed as a whole behind the LCD screen and the brightness of each light source is adjusted. Direct local dimming is similar to the full-array local dimming method, but it is a dimming method that adjusts the luminance of each light source with a smaller number of light sources.

In addition, the backlight may be an edge type backlight in which a plurality of light sources are disposed only at the edge portion of the LCD. In this case, the backlight can operate with Edge-lit local dimming. In the edge-lit local dimming, a plurality of light sources are disposed only at the edge of the panel, and may be disposed or positioned only at the left/right, at the top/bottom, or at the left/right/top/bottom. This is provided by way of an example only and not by way of a limitation.

In addition, the display 120 may be implemented as an organic light emitting diode (OLED) which does not require separate backlight.

In particular, the display 120 may display a content screen including a background image. At this time, the content screen may include an object layer including at least one graphic object, a shadow layer including a shadow for at least one graphic object, and a background image layer including a background image.

In addition, the processor 130 may drive the display 120 at a first frequency (e.g., 120 Hz or 240 Hz) while operating in the first operation mode, and may drive the display 120 at a second frequency (e.g., 60 Hz) that is less than the first frequency. That is according to an exemplary embodiment, by driving the display 120 at a low frequency while operating in the second operation mode, power consumption can be minimized.

The broadcast receiver 140 receives and demodulates broadcasts from a broadcasting station or satellite by wire or wirelessly. Specifically, the broadcast receiver 140 may receive and demodulate a transport stream through an antenna or a cable to output a digital transport stream signal.

The signal separator 145 separates the transport stream signal provided from the broadcast receiver 140 into a video signal, an audio signal, and an additional information signal. The signal separation unit 145 transmits the video signal and the audio signal to the A/V processor 150.

The A/V processor 150 performs signal processing such as video decoding, video scaling, and audio decoding on the video signal and the audio signal, which are input from the broadcast receiver 140 and the memory 165. The A/V processor 150 outputs the video signal to the video signal generator 160 and outputs the audio signal to the audio outputter 155, according to an exemplary embodiment.

In contrast, when the received video and audio signals are to be stored in the memory, the A/V processor 150 may output the video and the audio to the memory in a compressed form.

The audio outputter 155 converts the audio signal output from the A/V processor 150 into sound and outputs the sound through a speaker (not shown) or outputs the same to an external device connected through an external output terminal (not shown) (e.g., SPIDF, etc.).

The video signal generator 160 generates a graphic user interface (GUI) to be provided to a user. The video signal generator 160 adds the generated GUI to an image which is output from the A/V processor 150. The video signal generator 160 provides the display 120 with a video signal corresponding to the video to which the GUI is added. Accordingly, the display 120 displays various information provided by the electronic apparatus 100 and an image transmitted from the video signal generator 160.

The video signal generator 160 may process and output the content screen generated by the processor 130, according to an exemplary embodiment. Specifically, the video signal generator 160 may output a plurality of layers as they are or in an unmodified format, or may synthesize (or merge) a plurality of layers and provide them to the display 120.

The memory 165 stores various data and programs for controlling the electronic apparatus 100. The memory 165 may receive and store video and audio compressed image contents from the A/V processor 150, and output the video content stored according to the control of the processor 130 to the A/V processor 150. In particular, the memory 165 may store data for a background image, according to an exemplary embodiment.

According to one or more exemplary embodiments, the memory 165 can be implemented as a hard disk, a non-volatile memory, a volatile memory, or the like. These are provided by way of an example and not by way of a limitation.

The operator 180 is implemented as a touch screen, a touch pad, a key button, a keypad, or the like, and provides a user operation of the electronic apparatus 100. In the exemplary embodiment, it is described that a control command is input through the operator 180 provided in the electronic apparatus 100, but the operator 180 may receive a user operation from an external control device (for example, a remote controller). According to an exemplary embodiment, the operator 180 is a user interface configured to receive user input.

The communicator 175 is configured to perform communication with various types of external devices according to various types of communication methods, according to an exemplary embodiment. The communicator 175 may include a Wi-Fi chip and a Bluetooth chip (not shown). The processor 130 can communicate with various external devices using the communicator 175. Specifically, the communicator 175 can receive a control command from a control terminal device (for example, a smart phone, a remote controller) capable of controlling the electronic apparatus 100.

The communicator 175 may acquire weather information through communication with an external server.

In addition, though not illustrated in FIG. 3A, depending on exemplary embodiments, the communicator 175 may further include a USB port to which a USB connector can be connected, various external terminals for connecting to various external terminals such as a headset, a mouse, and a LAN, etc., and a DMB chip for receiving and processing a digital multimedia broadcasting (DMB) signal, and the like.

The processor 130 controls the overall operation of the electronic apparatus 100. Specifically, the processor 130 may control the video signal generator 160 (e.g., an image generator) and the display 120 to display an image according to the control command received through the operator 180 in the first operation mode, according to an exemplary embodiment.

The processor 130 may include a ROM 131, a RAM 132, a graphic processor (GPU) 133, a CPU 134, and a bus. The ROM 131, the RAM 132, the GPU 133, the CPU 134, and the like may be connected to each other via a bus.

The CPU 134 accesses the memory 165 and performs booting using an operating system (O/S) stored in the memory 165. The CPU 134 can perform various operations using various programs, contents, data stored in the memory 165, and the like. The operation of the CPU 134 is the same as the operation of the processor 130 of FIG. 2, according to an exemplary embodiment, and thus, redundant explanations are omitted.

The ROM 131 stores a command set for booting the system and the like.

When a turn-on command is input and power is supplied, the CPU 134 copies the O/S stored in the memory 165 to the RAM 132 in accordance with the command stored in the ROM 131, executes O/S to boot the system. When the booting is completed, the CPU 134 copies various programs stored in the memory 165 to the RAM 132, executes the program copied to the RAM 132, and performs various operations, according to exemplary embodiments.

When the booting of the electronic apparatus 100 is completed, the GPU 133 can generate a screen including various objects such as icons, images, text, and the like. In particular, according to an exemplary embodiment, when the electronic apparatus 100 is operating in the second operation mode, the GPU 133 may generate a content screen including graphic objects and shadows of graphic objects in the background image.

The configuration of GPU may be configured in a separate configuration such as the video signal generator 160 or may be implemented in the same configuration as the SoC combined with the CPU in the processor 130.

The signal separator 145, the A/V processor 150, the processor 130, and the video signal generator 160 may be implemented as a single chip. However, this is merely provided by way of an example and not by way of a limitation and the video signal generator may be embodied as at least two chips.

Hereinbelow, according to an exemplary embodiment, the operations of the processor 130 will further be described with reference to drawings.

According to an exemplary embodiment, the electronic apparatus 100 may receive, from an external portable terminal, data on or about a background image and store the same in the memory 165.

In particular, the electronic apparatus 100 can receive data on or about the background image obtained using the guide member from the portable terminal before the electronic apparatus 100 is installed.

Specifically, a user can fix the guide member to a place (for example, a wall) for installing the electronic apparatus 100.

When the guide member is fixed, the portable terminal can acquire an image including a guide member located in an area where the electronic apparatus 100 is to be installed using a camera. Then, the portable terminal can display the acquired image. At this time, the displayed image may include a plurality of indicators for guiding the position of the mark of the guide member for obtaining an optimal background image, according to an exemplary embodiment.

The portable terminal may analyze the background of an area (for example, a wall area) where the electronic apparatus 100 is located in the guide member of the photographed image, and obtain data regarding the background image of the position where the electronic apparatus 100 is installed. In this case, according to an exemplary embodiment, the background image is an image of an area (for example, a wall) in which the electronic apparatus 100 is installed, and when the background image is displayed on the electronic apparatus 100, a user may receive a window effect through the electronic apparatus 100.

The portable terminal may transmit information on or about a background image to the electronic apparatus 100.

Figure 4A:
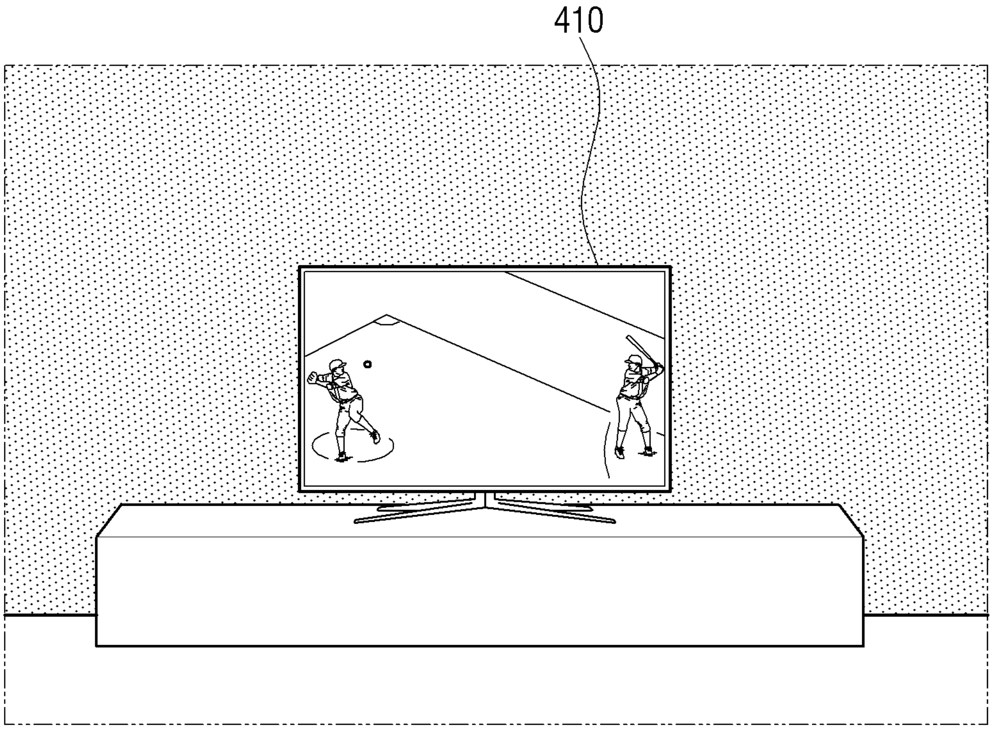
FIGS. 4A and 4B are views illustrating a first operation mode (normal mode) and a second operation mode (background mode) of an electronic apparatus according to an exemplary embodiment.

While operating in the first operation mode (i.e., the normal mode), according to an exemplary embodiment, the processor 130 may display the image content received from the outside or the previously stored image content on the display 120. For example, the processor 130 may cause the display 120 to display the broadcast content 410 received through the tuner, as shown in FIG. 4A, according to an exemplary embodiment.

While operating in the normal mode, a predetermined user command (for example, a command for selecting a specific button on the remote controller) is input or a preset event (for example, an event to detect a user when the electronic apparatus 100 is in a standby mode (the display 110 is off)), the processor 130 may switch an operation mode of the electronic apparatus 100 from a first operation mode to a second operation mode (that is, background mode).

Figure 4B:
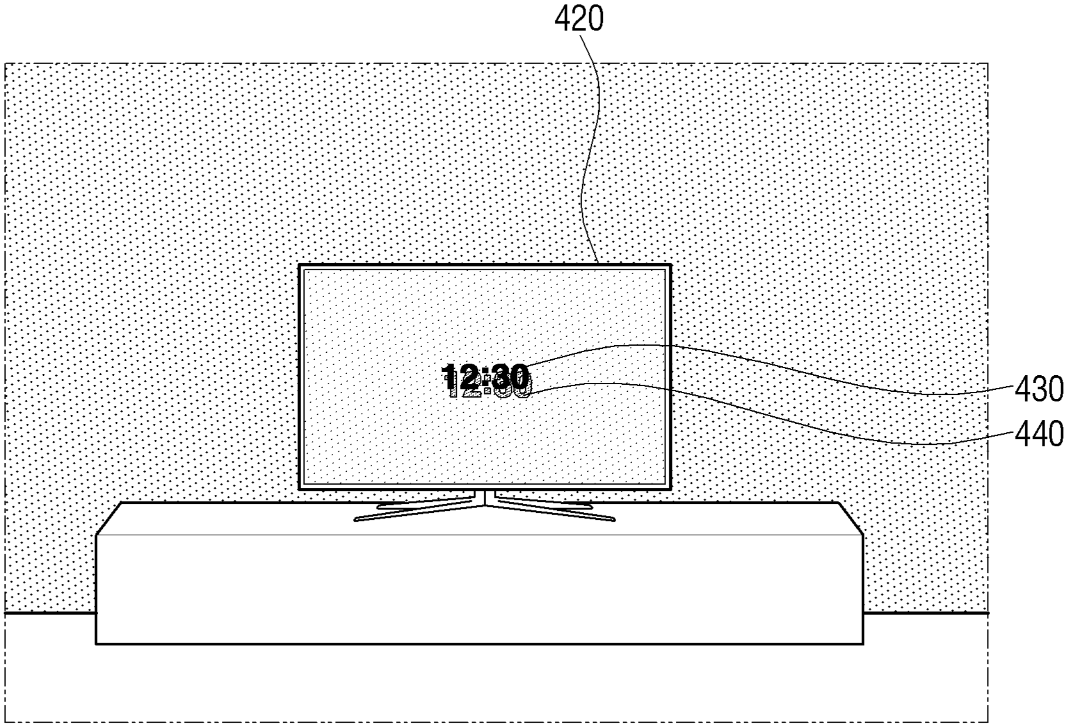

While operating in the second operation mode, according to an exemplary embodiment, the processor 130 may display a content screen including a background image based on the data on or about the background image pre-stored and the sensing data obtained through the at least one sensor 110. At this time, the content screen may include a clock object 430 on the background image 420 and a shadow 440 corresponding to the clock object 430, according to an exemplary embodiment, as shown in FIG. 4B.

According to an exemplary embodiment, a position and a shade of the shadow 440 may change in response to the change in the detected data. To be specific, according to an exemplary embodiment, the position and the shade of the shadow 440 may be adjusted based on the direction and light intensity of an external light.

Figure 5:
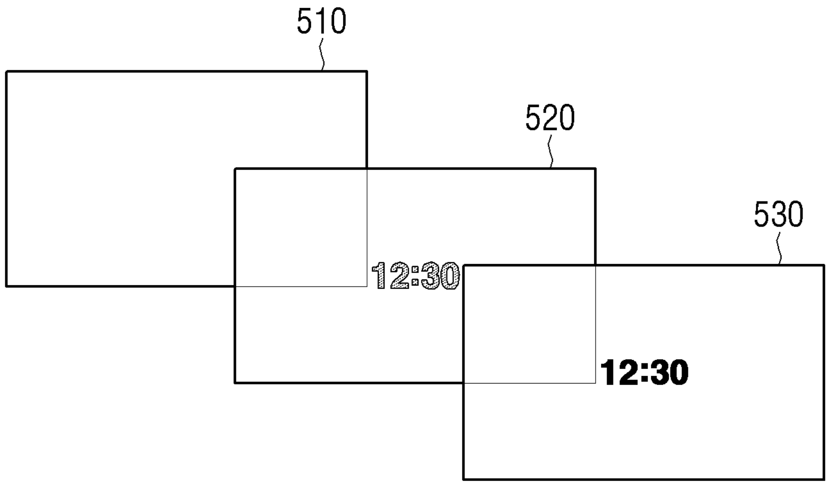
FIGS. 5-6C are views illustrating various layers generated by a processor according to an exemplary embodiment.

More specifically, as shown in FIG. 5, according to an exemplary embodiment, the processor 130 may generate a background image layer 510 including a background image 420 (shown in FIG. 4B) based on information about a background image. The processor 130 may generate an object layer 530 including a clock object 430 (shown in FIG. 4B) and a shadow layer 520 including a shadow 440 of the clock object 430. The processor 130, as shown in FIG. 5, may arrange the layers in the order of a background image layer 510, a shadow layer 520, and an object layer 530 and control the display 120 to display the layers arranged in that order, according to an exemplary embodiment.

In FIG. 5, it is described that one object layer 530 and one shadow layer 520 are generated. However, this is provided by way of an example and not by way of a limitation, and a plurality of object layers and a plurality of shadow layers may be generated. For example, the processor 130 may generate an object layer including a clock object and an object layer including a vine object, and may generate shadow layers corresponding to each object. When a plurality of object layers are generated, the processor 130 may arrange an object layer including an object to be displayed in front of the object to be displayed on the display 120. For example, when an object layer including a clock object and an object layer including a vine object are generated, the processor 130 may arrange an object layer including a clock object in front of an object layer including a vine object.

Figure 6A:
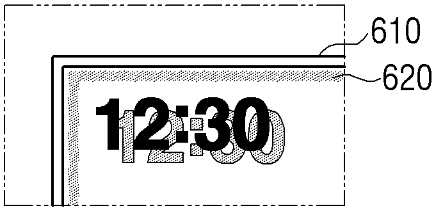

In particular, as shown in FIG. 6A, according to an exemplary embodiment, the electronic apparatus 100 may further include a bezel disposed or positioned at an edge of the display 120 and an outer frame 610 covering the bezel. According to an exemplary embodiment, the processor 130 may further generate an outer frame shadow layer for the shadow 620 with respect to the outer frame 610, and as illustrated in FIG. 6A, may display a content screen including the shadow 620 with respect to the outer frame 610 on the display 120.

Figure 6B:
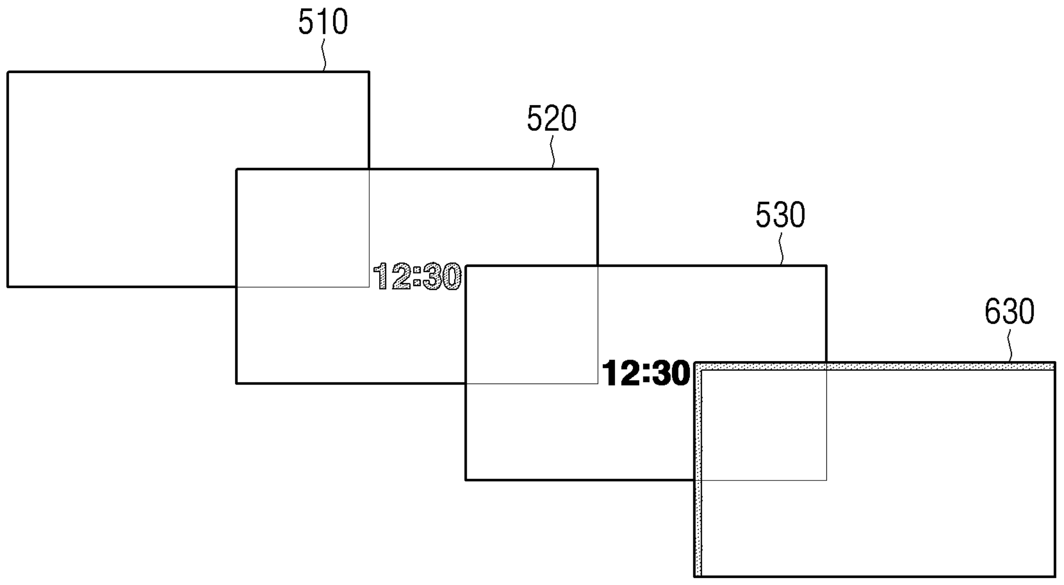

According to an exemplary embodiment, the processor 130 may arrange the background image layer 510, the shadow layer 520, the object layer 530, and the outer frame shadow layer 630 in a respective order, i.e., the forward order as shown in FIG. 6B, according to an exemplary embodiment. That is, when the outer frame shadow layer 630 is disposed or positioned in the foremost (front) position, if the shadow 620 of the outer frame overlaps with the graphic object, the shadow 620 of the outer frame appears to be positioned ahead of the graphic object, and a more realistic window effect can be provided.

Figure 6C:
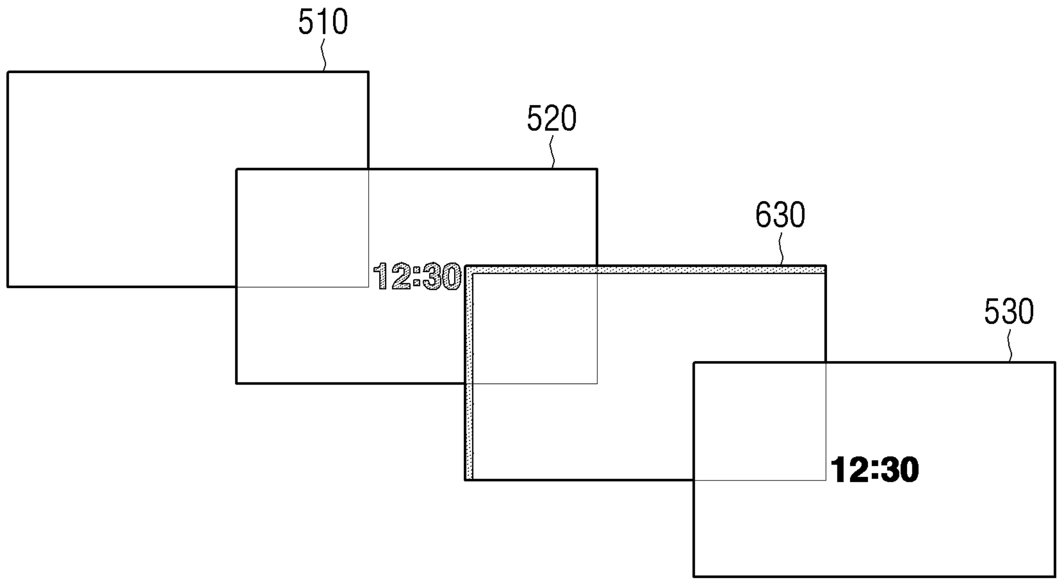

According to yet another exemplary embodiment, as illustrated in FIG. 6C, the processor 130 may dispose or position the background image layer 510, the shadow layer 520, the outer frame shadow layer 630, and the object layer 530 in a respective order and display the same on the display 120.

Hereinbelow, with reference to FIGS. 7A to 10 and with reference to a flowchart in FIG. 11, an exemplary embodiment illustrating providing an image effect in response to a detected illuminance value which is greater than or equal to preset value will be described.

The illuminance sensor 115 can sense external light to acquire sensed data. According to an exemplary embodiment, the sensing data may be data for determining the type and illuminance intensity of the external light. Specifically, the processor 130 may determine the color temperature information from the sensed data obtained by the illuminance sensor 115, and may determine the type of the external light based on the color temperature information. In addition, the processor 130 may determine the illuminance of the external light from the sensed data obtained by the illuminance sensor 115.

Figure 7A:
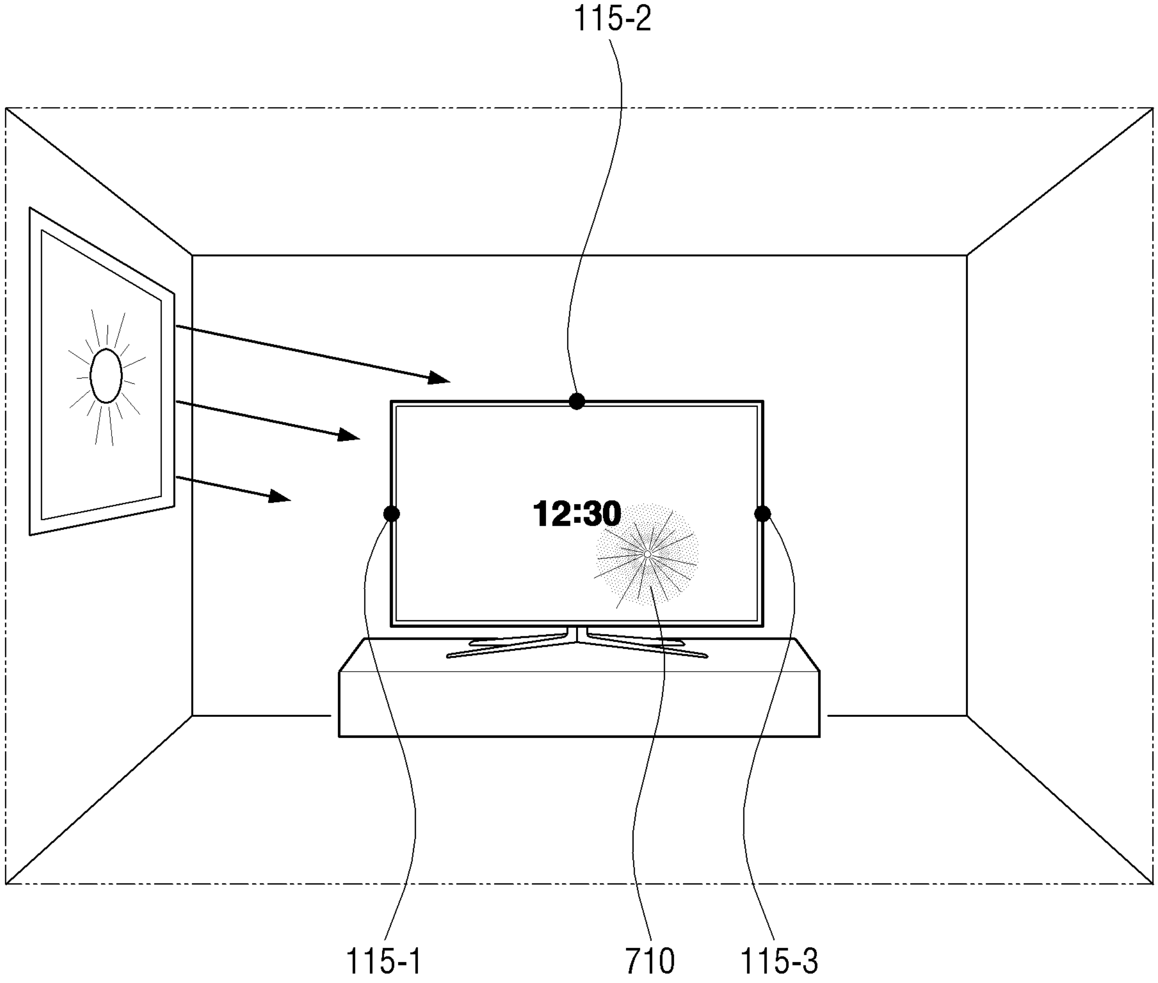
FIGS. 7A-10 are views illustrating an image effect in response to sensed illuminance value according to an exemplary embodiment.

In particular, as illustrated in FIG. 7A, according to an exemplary embodiment, while operating in the second operation mode (that is, displaying a content screen including a background image), the illuminance sensor 115 may obtain sensing data with respect to the external light (especially, sunlight).

Figure 7B:
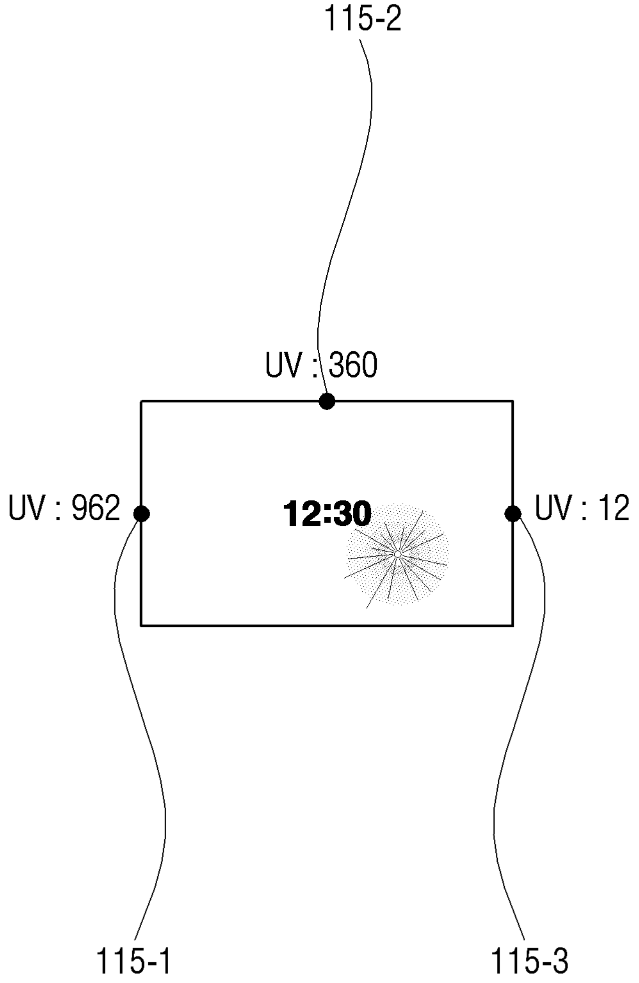

The processor 130 may determine the type and illuminance intensity of the external light based on the sensed data obtained from the illuminance sensor 115. To be specific, as illustrated in FIG. 7B, according to an exemplary embodiment, the processor 130 may determine that the type of external light is ultraviolet light and the illuminance value is 962 lux through the sensing data obtained from the first illuminance sensor 115-1, the type of external light is ultraviolet ray and the illuminance value is 360 lux through the sensing data obtained from the second illuminance sensor 115-2, and the type of external light is ultraviolet ray and the illuminance value is 12 Lux through the sensing data obtained from the third illuminance sensor 115-3.

The processor 130 may determine whether the illuminance value, which is sensed from at least one illuminance sensor from among a plurality of illuminance sensors 115-1 to 115-3, is greater than or equal to a preset value (for example, 700 lux).

When the illuminance value of a predetermined value or greater, is detected, the processor 130 may provide an image effect 710 corresponding to the illuminance value detected on the content screen. According to an exemplary embodiment, the image effect 710 may be a flare effect as shown in FIG. 7A. The flare effect is caused when the sunlight shines on the lens, causing the lens to diffuse light.

Figure 8A:
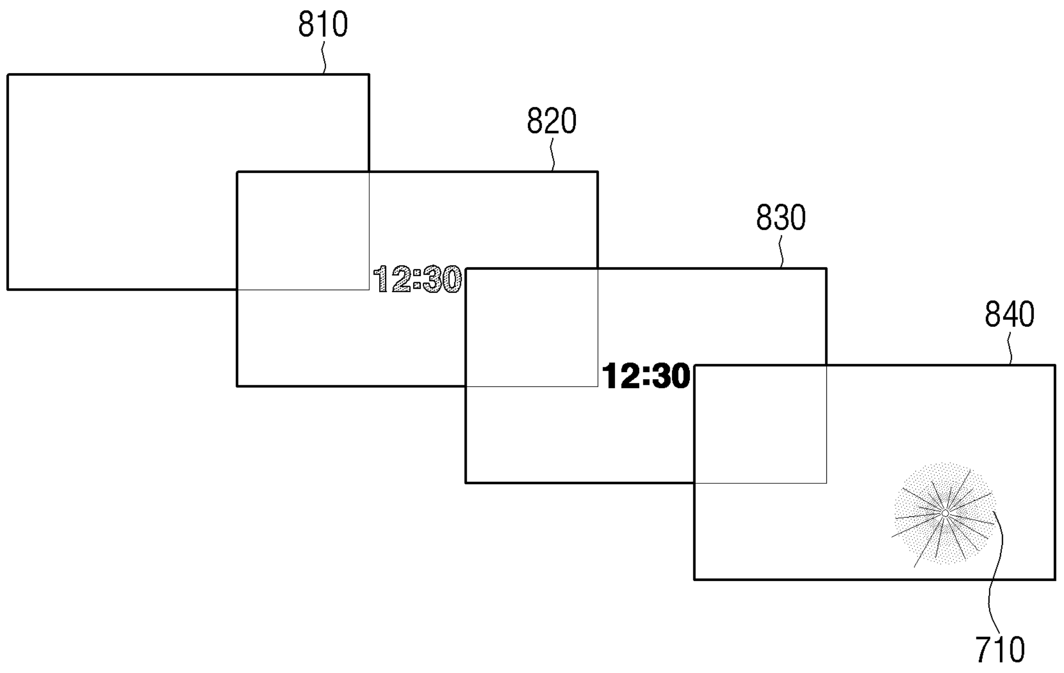

According to an exemplary embodiment, the processor 130 may further generate an image effect layer including an image effect 710 and, as illustrated in FIG. 8A, according to an exemplary embodiment, may display a content screen including a background image layer 810, a shadow layer 820, a graphic object layer 830 and an image effect layer 840, on the display 120 e.g., in a predetermined order such as the one shown in FIG. 8A.

Figure 8B:
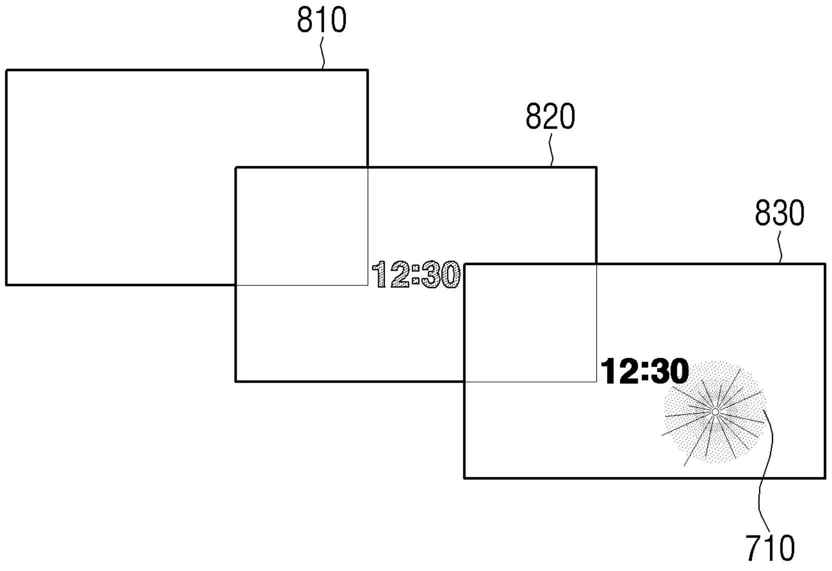

In addition, according to an exemplary embodiment, the processor 130 may generate the image effect 710 on the graphic object layer 830 so as to display the content screen on the display 120, which includes the background image layer 810, shadow layer 820, and graphic object layer 830, as shown in FIG. 8B.

According to an exemplary embodiment, the processor 130 provides the image effect 710 due to a strong light and thus, may not generate the shadow layer 820 or generate a dim shadow included in the shadow layer 820.

In addition, according to an exemplary embodiment, the processor 130 may determine a direction of external light based on sensing data obtained from a plurality of illuminance sensors 115-1 to 115-3, and determine a shape and a location of the image effect 710 according to the determined direction of the external light.

Figure 9A:
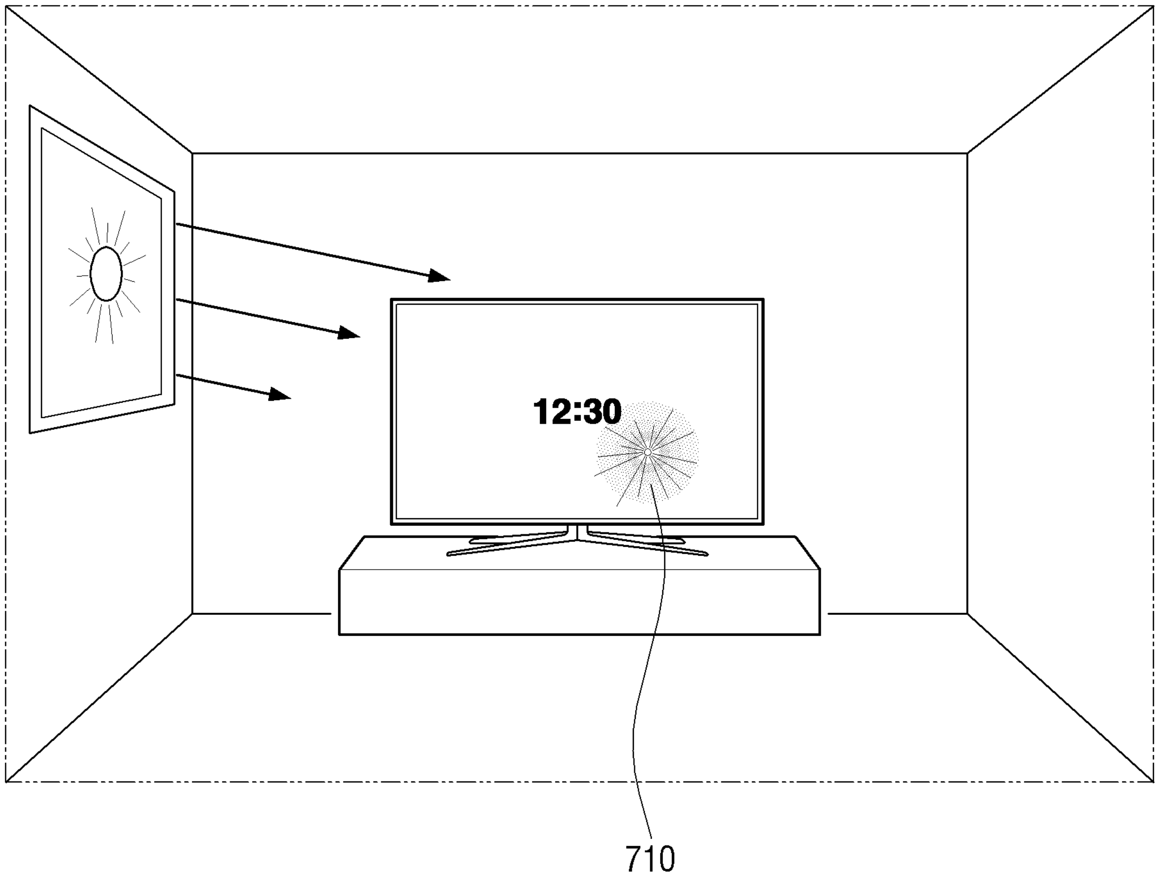
Figure 9B:
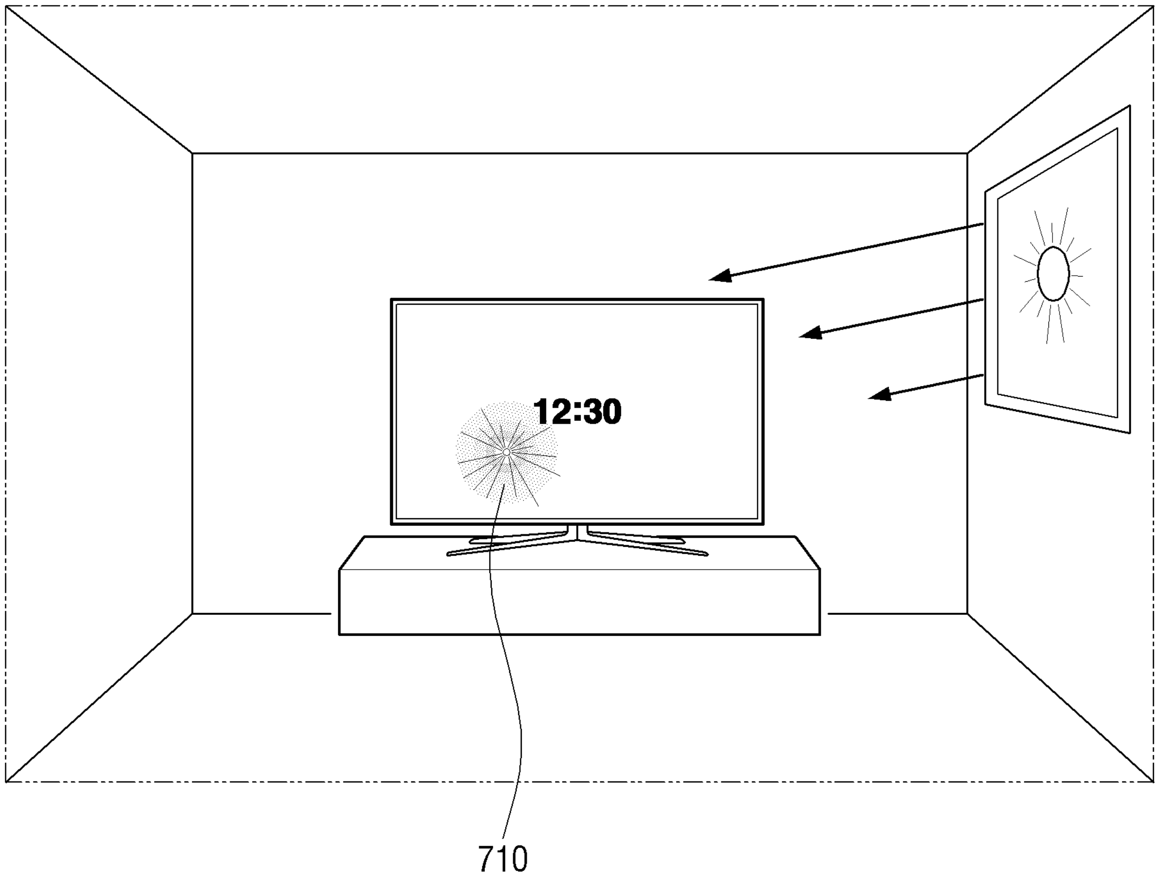

Specifically, when the illuminance value sensed by the first illuminance sensor 115-1 is greater than the illuminance value sensed by the third illuminance sensor 115-3, the processor 130 may determine that, as illustrated in FIG. 9A, according to an exemplary embodiment, the sunlight is incident on the window located on the left side of the electronic apparatus 100. According to an exemplary embodiment, the processor 130 may provide an image effect 710 to the lower right area of the display 120, as shown in FIG. 9A, according to the direction of incident sunlight. However, if the illuminance value sensed by the third illuminance sensor 115-3 is greater than the illuminance value sensed by the first illuminance sensor 115-1, the processor 130 may determine that sunlight is incident on the window located on the right side of the electronic apparatus 100. Accordingly, the processor 130 may provide an image effect 710 on the lower left area of the display 120, as shown in FIG. 9B, according to the direction of the incident sunlight. According to an exemplary embodiment, the processor 130 may determine the degree of an irregular reflection of the image effect 710 according to the illuminance value sensed through the plurality of illuminance sensors 115-1 to 115-3 to determine the shape of the image effect 710.

According to an exemplary embodiment, the memory 165 may store shape and position of the image effect 710 corresponding to the sensing data obtained from a plurality of illuminance sensors 115-1 to 115-3.

Figure 10:
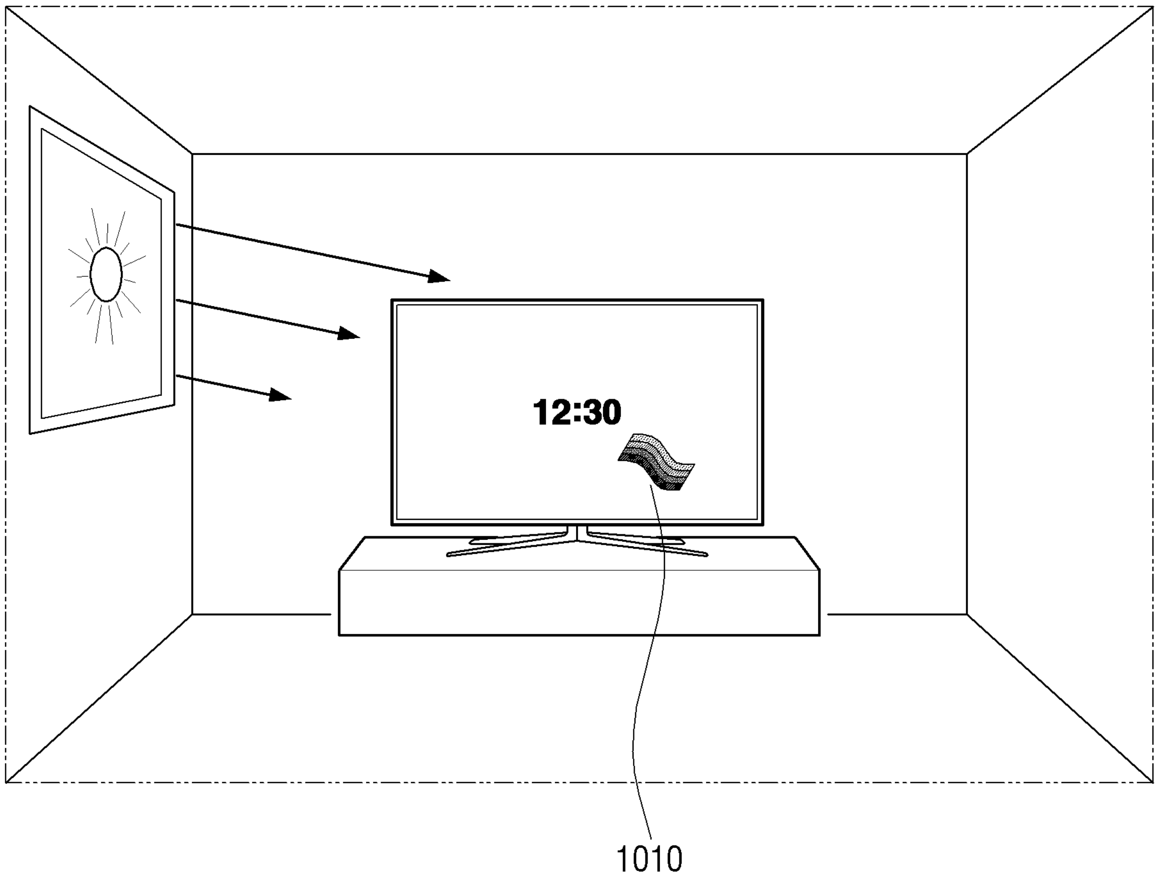

According to an exemplary embodiment, a flare effect may be provided as an image effect but this is merely an example and not by way of a limitation. Other image effects may be provided. For example, as illustrated in FIG. 10, the processor 130 may provide rainbow effect 1010 as the image effect.

In particular, the processor 130 may provide the rainbow effect 1010 as the image effect based on weather information received from the outside. For example, when weather information "clear up after rain" is received from the outside, the processor 130 may determine and provide the rainbow effect 1010 as the image effect.

Also, according to an exemplary embodiment, the processor 130 may provide different image effects depending on predetermined values for providing image effects. For example, when an illuminance value of a predetermined first value or more (for example, 700 lux) is detected, the processor 130 may provide a flare effect as an image effect, and if an illuminance value above the second preset value (e.g., 500 lux) is sensed, the processor 130 may provide a rainbow effect as an image effect.

Figure 11:
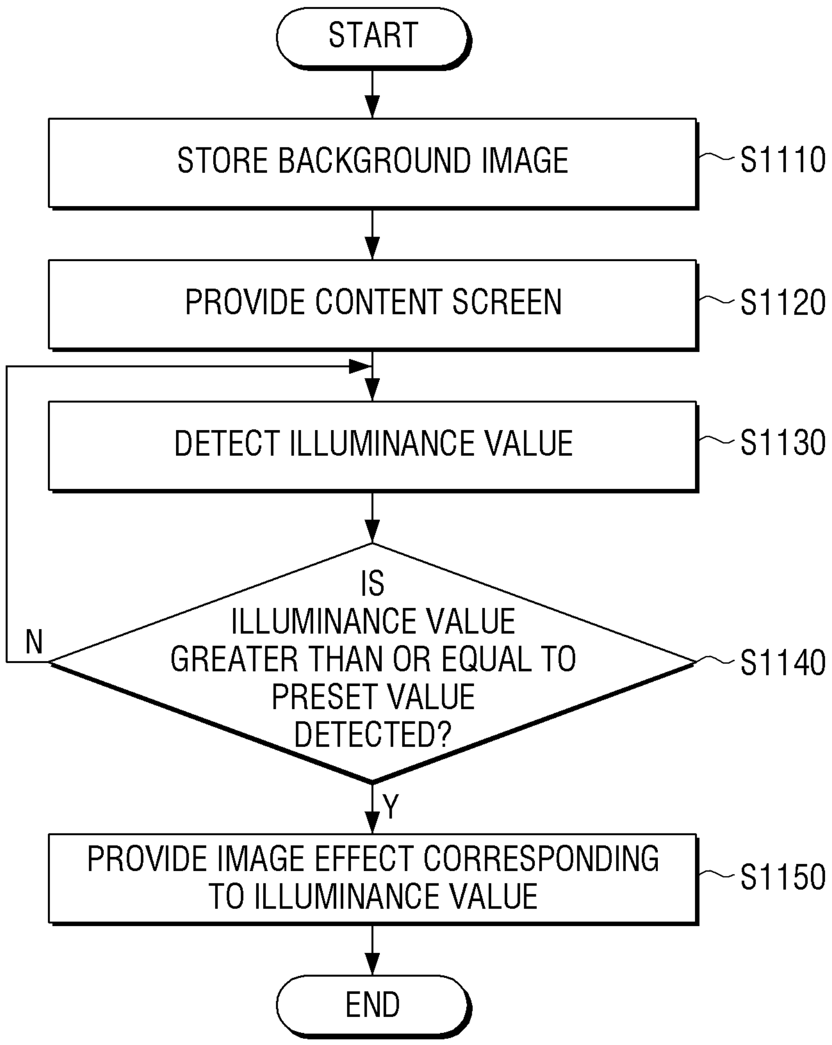
FIG. 11 is a flowchart illustrating a method of providing an image effect in response to sensed illuminance according to an exemplary embodiment.

FIG. 11 is a flowchart illustrating a method of providing an image effect in response to sensing an illuminance value which is greater than or equal to a preset value according to an exemplary embodiment.

The electronic apparatus 100 stores a background image (in operation S1110). According to an exemplary embodiment, the background image can be received from a portable terminal or captured by a camera of the electronic apparatus 100.

The electronic apparatus 100 provides a content screen (in operation S1120). In particular, while the electronic apparatus 100 is operating in the second operation mode, the electronic apparatus 100 may provide a content screen including an object layer including at least one graphic object and a background image layer including a background image.

The electronic apparatus 100 senses or detects the illuminance value through the illuminance sensor 115 (in operation S1130). In particular, the electronic apparatus 100 can sense the intensity of the external light around the electronic apparatus 100 through at least one illuminance sensor 115 disposed in or provided in the outer frame of the electronic apparatus 100.

The electronic apparatus 100 determines whether an illuminance value (the detected illuminance value) is greater than or equal to a preset value (in operation S1140). According to an exemplary embodiment, the predetermined value may be prestored at the time of making a product, but this is merely an example and is not provided by way of a limitation. For example, the predetermined value can be set by a user and/or updated from an external apparatus.

If the illuminance value is greater than or equal to a preset value (S1140-Y), the electronic apparatus 100 provides an image effect corresponding to the illuminance value (in operation S1150). According to an exemplary embodiment, the image effect may be a flare effect and/or a rainbow effect, but is not limited thereto.

As described above, according to an exemplary embodiment, when the illuminance value is greater than or equal to the preset value, the electronic apparatus 100 provides an image effect and thus, a user may receive a content screen which includes a background image that is more realistic.

Figure 12A:
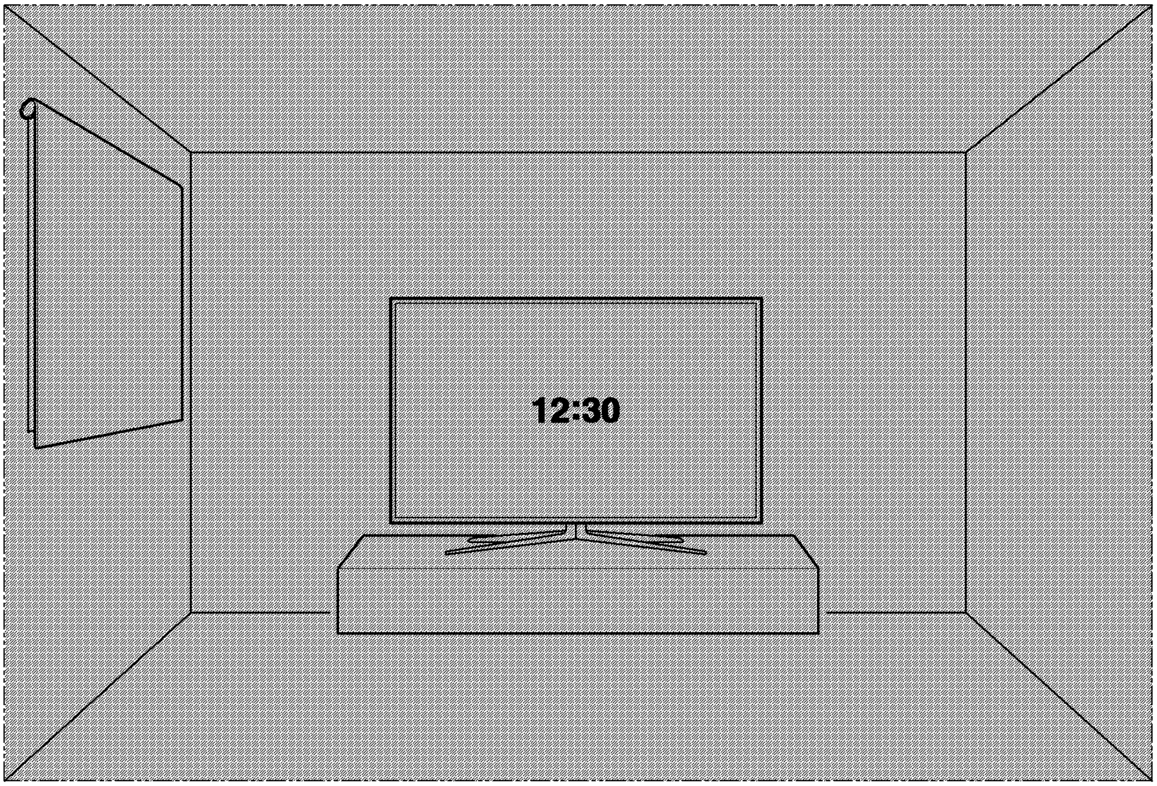
FIGS. 12A-B are views illustrating adjusting brightness of a content screen in response to a sensed change of illuminance according to another exemplary embodiment.
Figure 12B:
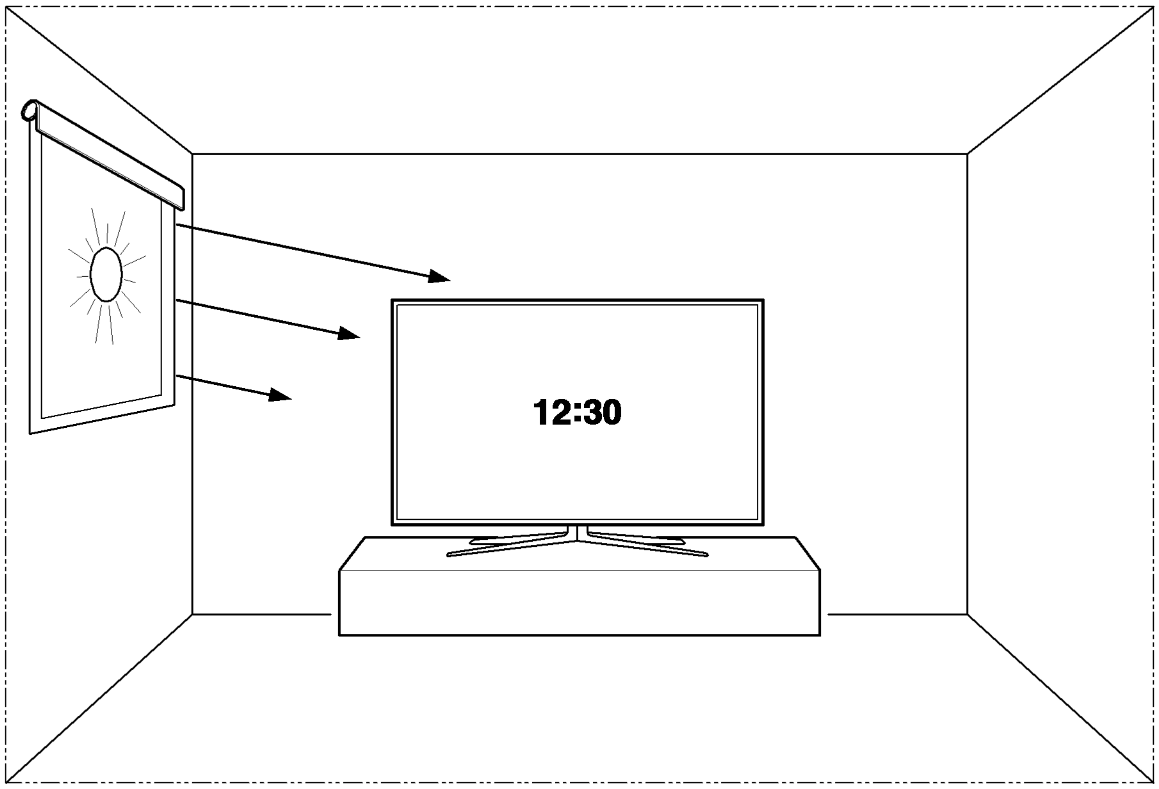
Figure 13:
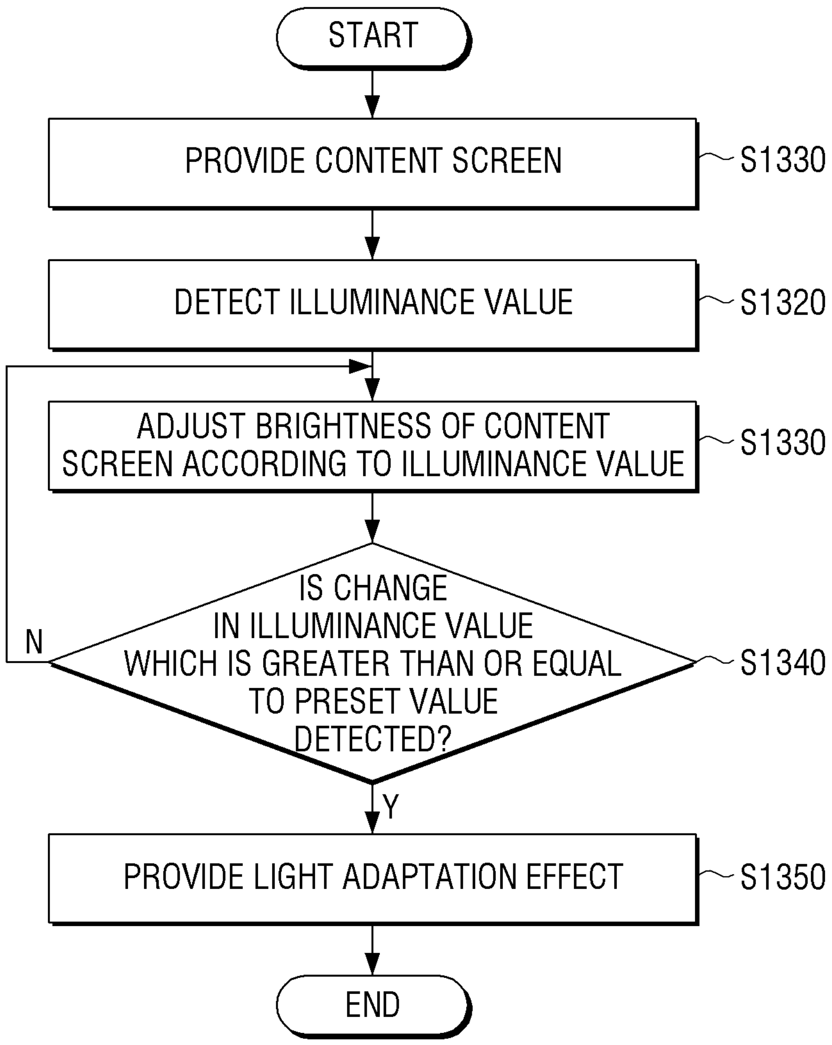
FIG. 13 is a flowchart illustrating a method of adjusting brightness of a content screen in response to a sensed change of illuminance according to another exemplary embodiment.
Figure 14A:
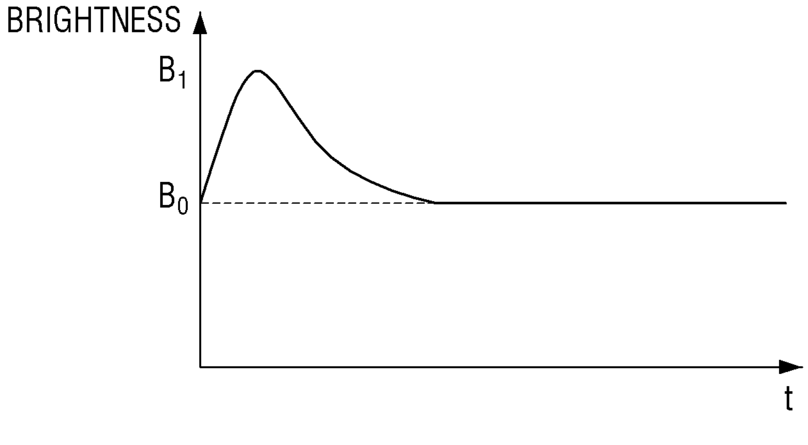
FIGS. 14A-15 are diagrams illustrating adjustment of brightness in a content screen in response to a sensed change of illuminance according to another exemplary embodiment.
Figure 14B:
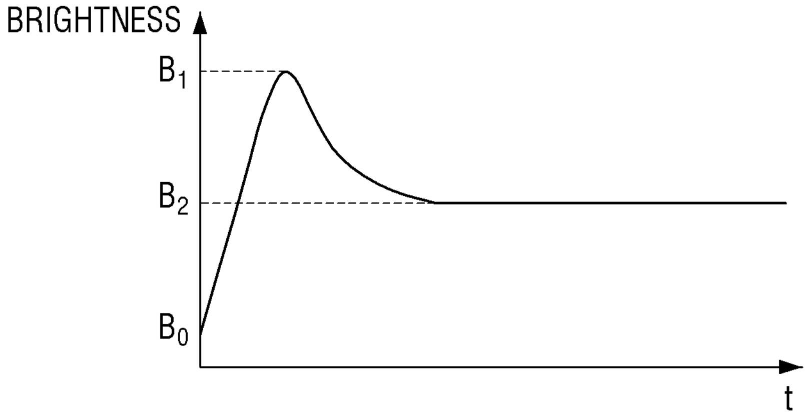
Figure 15:
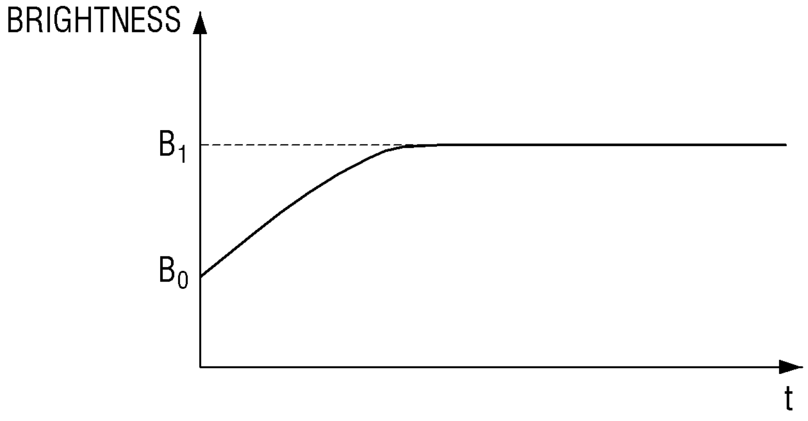
Figure 16:
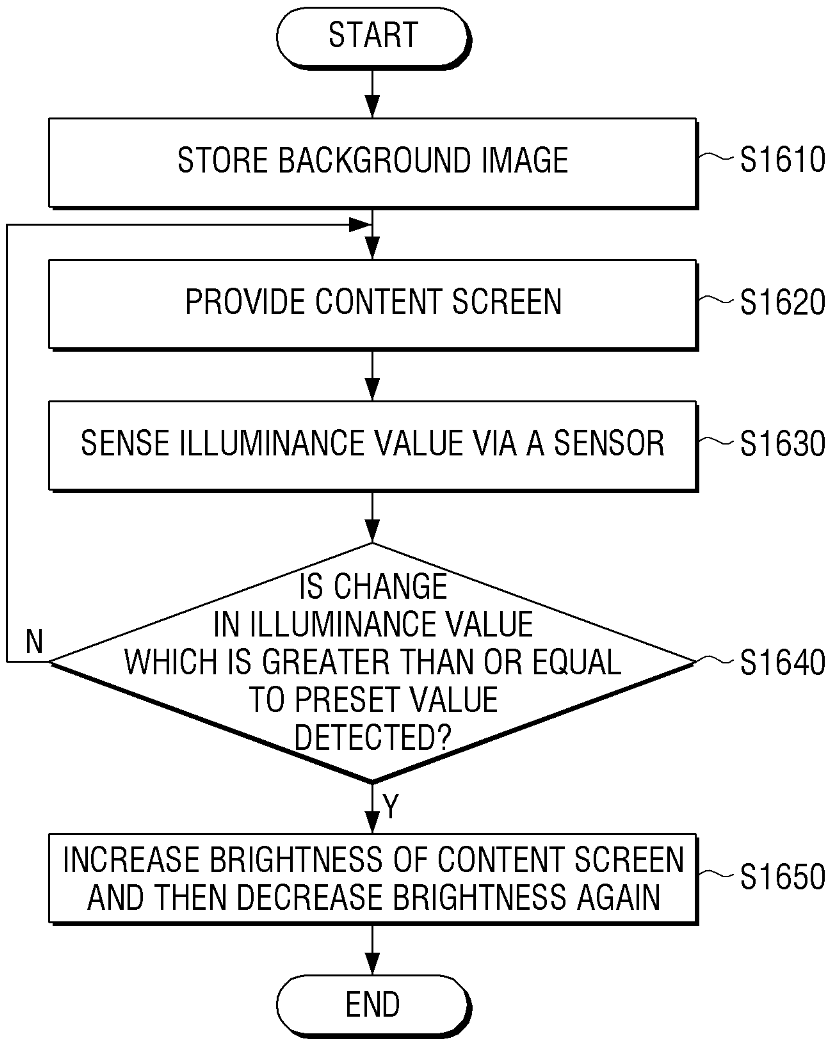
FIG. 16 is a flowchart illustrating a method of adjusting brightness of a content screen in response to a sensed change of illuminance according to another exemplary embodiment.

FIGS. 12A-B are views illustrating adjustment of brightness of a content screen according to an exemplary embodiment. FIG. 13 is a flowchart illustrating a method of adjusting the brightness of the content screen according to an exemplary embodiment and FIGS. 14-15 are diagrams illustrating adjustment of brightness in a content screen in response to a sensed change of illuminance according to another exemplary embodiment and FIG. 16 is a flowchart illustrating a method of adjusting brightness of a content screen in response to a sensed change of illuminance according to another exemplary embodiment.

According to an exemplary embodiment, the illuminance sensor 115 can sense external light and acquire sensed data. The acquired sensing data may be data for determining the illuminance of the external light. Specifically, the processor 130 can determine the illuminance value of the external light from the sensed data acquired by the illuminance sensor 115.

In particular, as illustrated in FIG. 12A, according to an exemplary embodiment, during the first operation mode (that is, displaying a content screen including a background image), the illuminance sensor 115 may acquire sensing data with respect to the external light.

The processor 130 may determine a change in illuminance value of the external light based on the sensed data obtained from the illuminance sensor 115. As illustrated in FIG. 12B, when curtain is unfolded suddenly so that a large amount of light is incident on the illuminance sensor 115 and the illuminance value obtained from the illuminance sensor 115 is determined to be equal to or greater than a preset value, the processor 130 may control the electronic apparatus 100 to increase the brightness and then decrease it back again. In other words, according to an exemplary embodiment, when the electronic apparatus 100 is suddenly brightened, the processor 130 may adjust the brightness of the content screen to provide a light adaptation effect.

An exemplary embodiment will be further described with reference to FIGS. 13-15B.

According to an exemplary embodiment, the electronic apparatus 100 provides a content screen (in operation S1310). In particular, while the electronic apparatus 100 is operating in the second operation mode, the electronic apparatus 100 may provide a content screen including an object layer including at least one graphic object and a background image layer including a background image.

The electronic apparatus senses an illuminance value through the illuminance sensor 115 (in operation S1320). In particular, the electronic apparatus 100 may detect an illuminance value of an external light through a plurality of illuminance sensors 115 provided in the outer frame of the electronic apparatus 100.

The electronic apparatus 100 adjusts the brightness of the content screen according to the illuminance value (in operation S1330). Specifically, the electronic apparatus 100 can adaptively adjust the screen of content according to the sensed illuminance value. For example, if the sensed illuminance value is a first value, the electronic apparatus 100 may adjust the screen brightness of the content to correspond to the first value, and if the sensed illuminance value is a second value, the electronic apparatus 100 may adjust the brightness of the content screen so as to correspond to the second value. At this time, when the second value is greater than the first value, the brightness of the content screen corresponding to the second value may be higher than the brightness of the content screen corresponding to the first value.

The electronic apparatus 100 determines whether a change in an illuminance value which is greater than or equal to a preset value is sensed or detected (in operation S1340). That is, in an exemplary embodiment, the electronic apparatus 100 determines if a change in an illuminance value is sensed and whether the sensed change value is greater than or equal to a preset value. For example, the electronic apparatus 100 may determine whether increase in an illuminance value which is greater than or equal to 500 lux is sensed.

If a change in illuminance value exceeding a preset value is sensed (in operation S1340-Y), the electronic apparatus 100 provides light adaptation effect (in operation S1350). In this case, the light adaptation effect is an effect to reproduce the phenomenon of sudden dazzling when a person enters a bright place from a dark place. It is an effect of rapidly increasing the brightness of the content screen to a preset value and then reducing the brightness again.

To be specific, the electronic apparatus 100 may drastically increase the brightness of the content screen and then decrease the brightness again, according to an exemplary embodiment. For example, while displaying a content screen with the brightness of B0, when a change in an illuminance value which is greater than or equal to the preset value is sensed, the electronic apparatus 100, as illustrated in FIG. 14A, may drastically increase the brightness of the content screen to B1 and then reduce the brightness to B0 again. According to yet another exemplary embodiment, if a change in illuminance value over a preset value is detected while displaying the content screen with the brightness of B0, the electronic apparatus 100 rapidly increases the brightness of the content screen to B1, as shown in FIG. 14B, and then reduce the brightness to B2 which is higher than B0 but less than B1. According to an exemplary embodiment, the value of B1 may be determined according to the amount of change in illuminance value (or the final illuminance value sensed). That is, the larger the change in the illuminance value (or the final illuminance value sensed), the larger the value B1, and the smaller the change in the illuminance value (or the final illuminance value sensed), the smaller the value B1.

According to an exemplary embodiment, when a change in the illuminance value over a predetermined value is sensed while an illuminance value (for example, 5 lux) which is less than or equal to a preset value for a preset time (for example, 10 minutes) is maintained, the electronic apparatus 100 may provide the light adaptation effect. That is, the electronic apparatus 100 can provide the light adaptation effect when a sudden bright light is incident after a dark state is maintained for a predetermined time, and a change in the illuminance value over a preset value (for example a preset time value) is detected.

However, if a change in illuminance value is less than a preset value is sensed (in operation S1340-N), the electronic apparatus 100 can adjust the brightness of the content screen to correspond to the change in the sensed illuminance value (in operation S1330).

In particular, when a change in illuminance value less than a predetermined value is detected, the electronic apparatus 100 can gradually adjust the brightness of the content screen to correspond to the changed illuminance value. Specifically, when the illuminance value detected by the illuminance sensor 115 is increased to B1 while the content screen is displayed with the brightness of B0 corresponding to the sensed illuminance value, the electronic apparatus 100 may adjust the brightness of the content screen to B1 corresponding to the illuminance value as illustrated in FIG. 15, according to an exemplary embodiment. At this time, the value of B1 may be determined according to the sensed final illuminance value. That is, the larger the sensed final illuminance value, the greater the B1 value, and the smaller the sensed final illuminance value, the smaller the B1 value.

According to an exemplary embodiment, in order to adjust the brightness of the content screen, the electronic apparatus 100 may increase the brightness of the content screen by adjusting the pixel brightness values of the background image layer and the object layer included in the content screen, and then decrease the brightness. That is, the electronic apparatus 100 can adjust the brightness of the content screen through image processing.

Alternatively, the electronic apparatus 100 may increase the brightness of the content screen by adjusting the dimming value of the backlight included in the display, and then decrease the brightness of the content screen. Specifically, the electronic apparatus 100 may increase the brightness of the content screen by increasing the dimming value of the backlight included in the display, and then reduce the brightness of the content screen by decreasing the dimming value of the backlight.

Also, the electronic apparatus 100 can determine the direction of the external light through the sensing data obtained through the plurality of illuminance sensors 115-1 to 115-3, according to an exemplary embodiment. For example, if it is determined that the illuminance value detected by the first illuminance sensor 115-1 from among the plurality of illuminance sensors 115-1 through 115-3 is higher than the illuminance value sensed by the third illuminance sensor 115-3, the electronic apparatus 100 may determine that the external light is illuminated from the left side.

The electronic apparatus 100 can adjust the brightness of each area differently based on the determined direction of the external light, according to an exemplary embodiment. Specifically, the electronic apparatus 100 may increase the brightness of the area corresponding to the direction of the external light determined in the content screen, and then decrease the brightness. For example, if it is determined that the direction of the external light is on the left side, the electronic apparatus 100 can increase the brightness of the left area of the content screen and then decrease it again. Alternatively, the electronic apparatus 100 can adjust the brightness of the area corresponding to the direction of the external light in the content screen and the brightness of the remaining area, differently. For example, if it is determined that the direction of the external light is on the left side, the electronic apparatus 100 may increase the brightness of the left area of the content screen to a higher brightness value than the brightness of the right area and then decrease to the same brightness value again.

FIG. 16 is a flowchart illustrating a method of adjusting the brightness of a content screen in response to detected change in an illuminance value according to an exemplary embodiment.

The electronic apparatus 100 stores a background image (in operation S1610). At this time, the background image may be received from a portable terminal, as described above, and captured by a camera of the electronic apparatus 100.

The electronic apparatus 100 provides a content screen (in operation S1620). In particular, while the electronic apparatus 100 is operating in the second operation mode, the electronic apparatus 100 may provide a content screen including an object layer including at least one graphic object and a background image layer including a background image.

The electronic apparatus 100 senses the illuminance value through the illuminance sensor 115 (in operation S1630). To be specific, the electronic apparatus 100 can sense the illuminance value of the external light around the electronic apparatus 100 through at least one illuminance sensor 115 disposed in or positioned in an outer frame of the electronic apparatus 100.

The electronic apparatus 100 determines whether a change in illuminance value from the sensed illuminance value is equal to or greater than a predetermined value (the set value), is detected (in operation S1640). At this time, the illuminance value change over a predetermined value may be 500 lux, but this is by way of an example only and not by way of a limitation. The predetermined value may be determined to be a different value.

If a change in illuminance value is greater than or equal to a predetermined value, is detected (in operation S1640-Y), the electronic apparatus 100 increases the brightness of the content screen and then decreases it again to provide a content screen (in operation S1650). That is, the electronic apparatus 100 can provide the light adaptation effect in response to a sudden increase in an amount of the external light.

As described above, according to an exemplary embodiment, since the electronic apparatus 100 provides the light adaptation effect in response to a change in illuminance value above or equal to a predetermined value, a user can further receive a content screen including a realistic background image.

Figure 17:
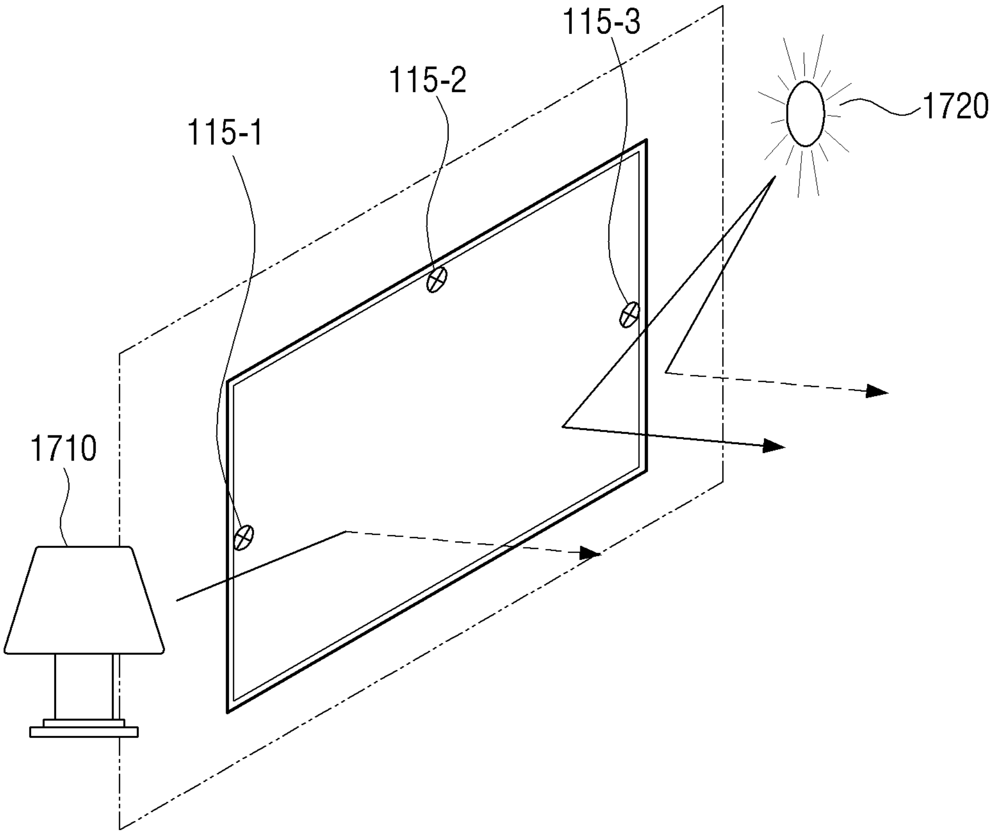
FIGS. 17 and 18 are views illustrating correction of a content screen according to color temperature information and illuminance information sensed through each of a plurality of illuminance values according to yet another exemplary embodiment.
Figure 18:
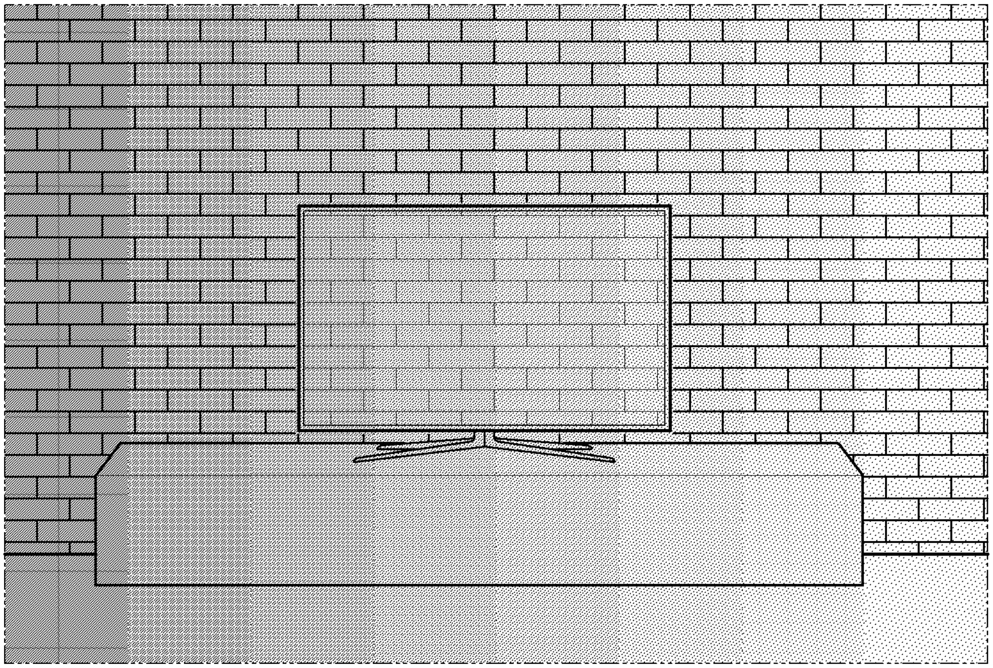
Figure 19:
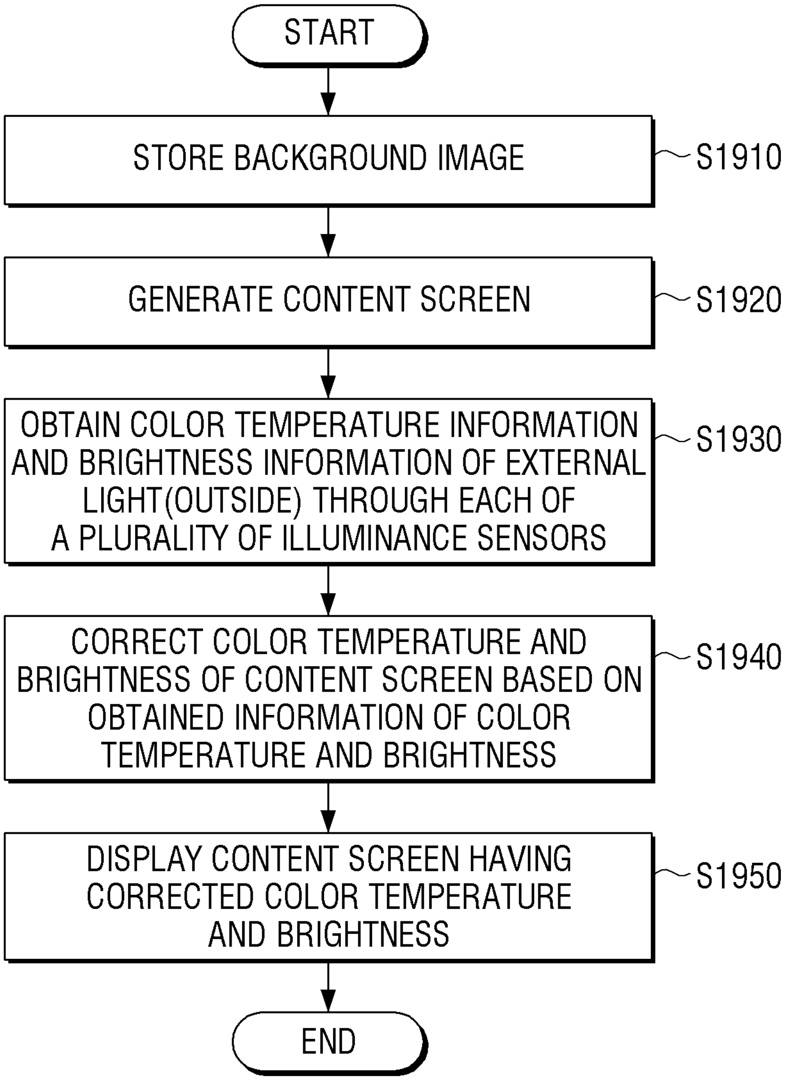
FIG. 19 is a flowchart illustrating a method of correcting a content screen according to color temperature information and illuminance information sensed through each of a plurality of illuminance values according to yet another exemplary embodiment

FIGS. 17 and 18 are views illustrating correcting a content screen according to color temperature information and illuminance information sensed through each of a plurality of illuminance sensors according to yet another exemplary embodiment and FIG. 19 is a flowchart illustrating a method of correcting a content screen according to color temperature information and illuminance information sensed through each of a plurality of illuminance sensors according to yet another exemplary embodiment.

In order for the content screen including the background image to provide an image effect like an actual window during operation in the background mode, the electronic apparatus 100 must adaptively adjust the content screen in accordance with the light incident from the outside. That is, according to an exemplary embodiment, the electronic apparatus 100 needs to correct the content according to the color temperature and brightness of the external light, so that the content screen including the background image can be felt as an actual window.

In particular, a plurality of types of external light may be incident on an area where the electronic apparatus 100 is located, rather than one external light. For example, as shown in FIG. 17, according to an exemplary embodiment, a lamp 1710 is disposed on or is positioned on the left side of the electronic apparatus 100, and an external light generated by a lamp 1710 may be incident on the left side of the electronic apparatus 100. A window may exist or there may be a window to the the right side of the electronic apparatus 100. As such, the external light generated by the sunlight 1720 may be incident on the right side of the electronic apparatus 100 through the window existing in the room.

In this case, according to an exemplary embodiment, the electronic apparatus 100 can correct the color temperature and brightness of the content screen based on the color temperature and brightness of the external light incident on the plurality of areas of the electronic apparatus 100.

Specifically, while operating in the second operation mode (that is, displaying a content screen including a background image), the illuminance sensor 115 can sense the external light and acquire sensed data. According to an exemplary embodiment, the sensed data may be data for determining the color temperature and the illuminance of the external light.

Particularly, the processor 130 can obtain color temperature and brightness information of the external light incident on a plurality of areas through the illuminance sensors 115-1 to 115-3 arranged in a plurality of areas of the frame. For example, as shown in FIG. 17, the plurality of illuminance sensors may include a first illuminance sensor 115-1 disposed at or positioned at the center of the left outer frame, a second illuminance sensor 115-2 positioned at or disposed at the center of the upper outer frame, and a third illuminance sensor 115-3 disposed at or positioned at the center of the right outer frame.

The processor 130 may correct the color temperature and the brightness of the content screen by various areas based on the sensed color temperature information and the brightness information.

According to an exemplary embodiment, the processor 130 can correct the color temperature of the content screen on an area-by-area basis based on the color temperature information detected through the illuminance sensors 115-1 to 115-3. Specifically, the processor 130 may obtain the color temperature information of the XYZ domain from each of the plurality of illuminance sensors 115-1 to 115-3. The processor 130 may then convert the color temperature information of the XYZ domain obtained from each of the illuminance sensors 115-1 to 115-3 into the RGB domain. According to an exemplary embodiment, the processor 130 may perform gamma correction according to the display characteristics for each color temperature information converted into the RGB domain to realize the actual color.

The processor 130 can obtain a gain value for color temperature correction of the pixels constituting the content screen based on the position of the plurality of illuminance sensors and the color temperature information converted into the RGB domain. For example when it is determined that the external light having a high R component is incident from the first illuminance sensor 115-1 disposed on or positioned at the left side, the processor 130 may obtain a gain value having high R value. Alternatively, the processor 130 may obtain a gain value of pixels having a lower R value from the left area to the right area. As another example, when it is determined that the external light having a high G component is incident from the third illuminance sensor 115-3 disposed on or positioned at the right side, the processor 130 may obtain a gain value having a high G value for the pixels disposed in or positioned on the right side. Alternatively, the processor 130 may obtain a gain value of pixels having a lower G value from the right area to the left area.

In addition, the processor 130 may correct a color temperature value on an area-by-area basis based on the obtained gain value. That is, the processor 130 may correct the color temperature of a content screen based on the differently obtained gain values by areas. According to an exemplary embodiment, the processor 130 may divide a content screen into a plurality of areas and correct color temperature of a screen by the divided plurality of areas i.e., area by area, but this is provided by way of an example only and not by way of a limitation and the processor 130 can correct the color temperature of a content screen by pixels. That is, the processor 130 may correct the color temperature of a content screen based on a gain value obtained differently according to a position of each pixel from among a plurality of pixels.

Also, the processor 130 can correct the brightness of the content screen on an area-by-area basis based on the brightness information detected by the brightness sensors 115-1 to 115-3. In particular, the processor 130 may obtain brightness information from each of the plurality of illuminance sensors 115-1 to 115-3. The processor 130 may then obtain reflectance information for an object located behind the electronic apparatus 100. In this case, the reflectance information of the object is reflectance information according to the characteristic of the object, for example, 24% for paper and 30% for acrylic. Further, reflectance information of an object may be pre-stored, but this is by way of an example only and not by way of a limitation and the information can be obtained from an external server.

The processor 130 may correct the brightness of the content screen on an area-by-area basis based on a plurality of illuminance sensor positions, brightness information, and reflectance information of the object. According to an exemplary embodiment, the processor 130 may adjust the brightness values of the pixels constituting the content screen by area to adjust the brightness values of the pixels constituting the content screen by area, and correct the brightness of the content screen for each area by adjusting the dimming value of the backlight included in the display 120.

When the processor 130 corrects the brightness and color temperature of the content screen in the area as described above, according to an exemplary embodiment, the display 120 may provide a background image which is similar as much as possible with a background of which brightness and color temperature are different by areas, as shown in FIG. 18. According to an exemplary embodiment, the background image is adjusted by various areas and/or pixels to match the outside environment i.e., the brightness and color of the environment or the background behind the electronic apparatus 100, as shown in FIG. 18.

FIG. 19 is a flowchart illustrating a method of correcting a content screen according to color temperature information and illuminance information sensed by each of the plurality of illuminance sensors according to an exemplary embodiment.

According to an exemplary embodiment, the electronic apparatus 100 stores a background image (in operation S1910). According to an exemplary embodiment, the background image may be received from the portable terminal, as described above, and may be photographed from the camera of the electronic apparatus 100.

The electronic apparatus 100 generates a content screen (in operation S1920). In particular, while the electronic apparatus 100 is operating in the second operation mode, the electronic apparatus 100 may generate a content screen including an object layer including at least one graphic object and a background image layer including a background image.

The electronic apparatus 100 obtains color temperature information and brightness information of an external light through each of the plurality of illuminance sensors 115-1 to 115-3 (in operation S1930). According to an exemplary embodiment, the plurality of illuminance sensors 115-1 to 115-3 may be disposed in or position in a plurality of areas of the outer frame housing of the display 120. For example, it may include a first illuminance sensor disposed in or located in the left outer frame of the outer frame, a second illuminance sensor disposed in or located in the upper outer frame, and a third illuminance sensor disposed in or located in the right outer frame.

The electronic apparatus 100 corrects the color temperature and brightness of the content screen for each area based on the color temperature information and the brightness information of the external light (in operation S1940). Specifically, the electronic apparatus 100 may determine color temperature information and brightness information sensed by areas of the display 120 based on the color temperature information and brightness information of the external light sensed through a plurality of illuminance sensors 115-1 to 115-3. In addition, the electronic apparatus 100 may correct color temperature and brightness of the content screen by areas based on the color temperature information and brightness information.

According to an exemplary embodiment described above, a user can be provided with a content screen including a background image similar to a real window. According to an exemplary embodiment, the content screen is displayed with the corrected color temperature and brightness (in operation S1950).

Hereinafter, an exemplary embodiment of a third operation mode for providing a content image and a background image together will be described with reference to FIGS. 20A to 26.

Figure 20A:
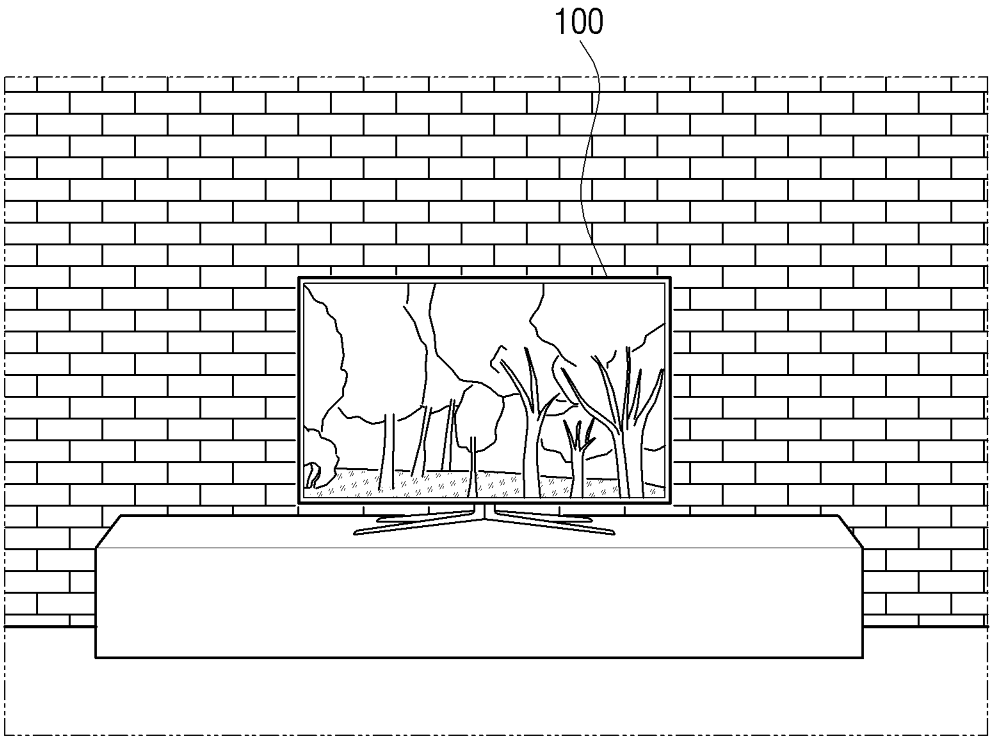
FIGS. 20A to 20C are views illustrating a plurality of operation modes of an electronic apparatus according to yet another exemplary embodiment.
Figure 20B:
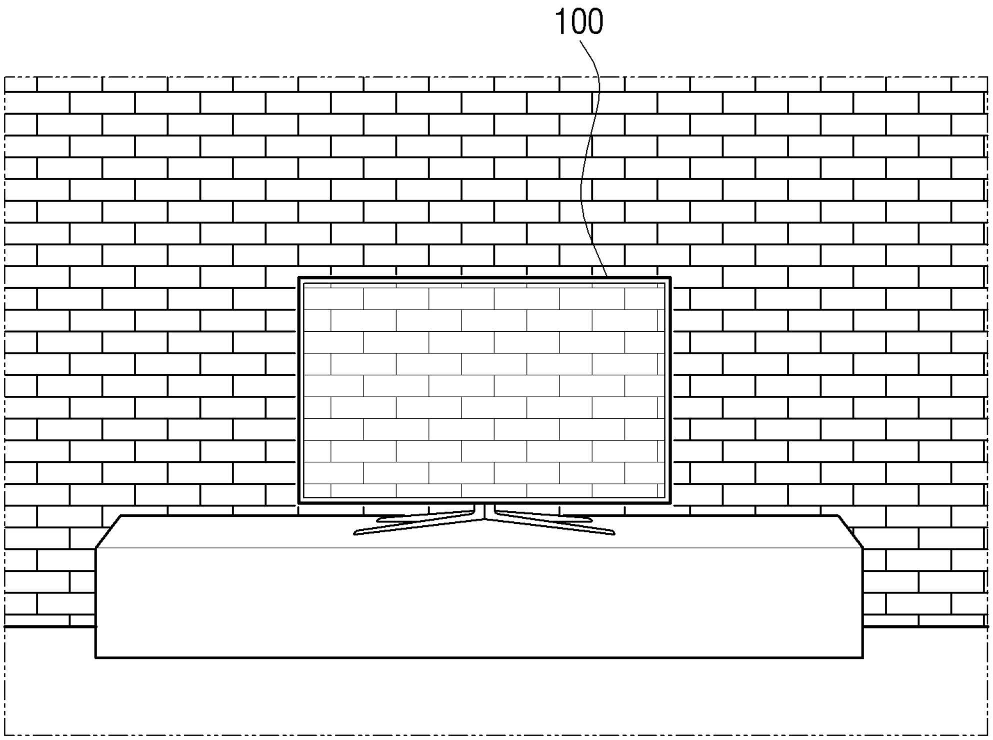
Figure 20C:
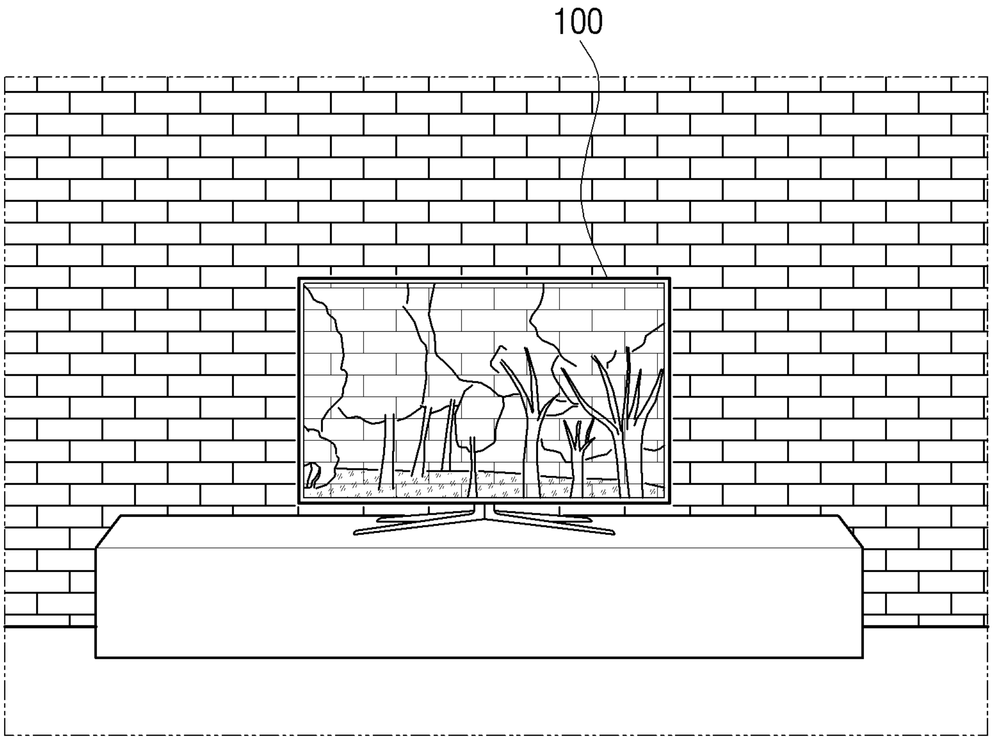

FIGS. 20A to 20C are views illustrating a plurality of operation modes of an electronic apparatus according to an exemplary embodiment. The electronic apparatus 100 according to an exemplary embodiment has a plurality of operation modes.

Referring to FIG. 20A, according to an exemplary embodiment, a first mode (for example, a normal mode) is a mode for displaying a general content image. Specifically, the first mode is a mode in which a content layer including an image (for example, a broadcast content image, etc.)

received from an external source (e.g., a broadcast station or a satellite) is displayed using the screen of the electronic apparatus 100. For example, the electronic apparatus 100 may display broadcast content images received via a tuner on a display. However, exemplary embodiment is not limited thereto and is provided by way of an example only. The first mode may include displaying by the electronic apparatus 100 the previously stored content image (for example, a photo content image).

Referring to FIG. 20B, according to an exemplary embodiment, a second mode (for example, a background mode) is a mode in which a background image layer is displayed including a background image corresponding to a background area behind the electronic apparatus using a screen of the electronic apparatus. In this case, the electronic apparatus may provide the user with a visual effect as if the electronic apparatus is a glass window and/or a transparent window.

According to an exemplary embodiment, the background image may be implemented as a live view obtained by a camera disposed behind the electronic apparatus 100 or positioned or located on a rear side of the electronic apparatus to obtain a live view of space behind the rear side of the electronic apparatus, or may be implemented as a still image or a moving image pre-stored in the electronic apparatus 100. According to an exemplary embodiment, a live view of an actual space is obtained or captured by a camera. According to an exemplary embodiment, the live view of a wall behind the electronic apparatus 100 is captured.

On the other hand, the screen in the second mode (for example, the background mode) may further include at least one of at least one graphic object and at least one shadow of the at least one graphic object, as well as the background image, according to an exemplary embodiment. The graphic object may be a clock object, but various graphic objects (e.g., pictures, photographs, fish tanks, memos, etc.) may be displayed if they can be attached to a tangible wall within a room, for example, according to an exemplary embodiment. The second mode described with reference to FIG. 20B has been described in detail above, according to various exemplary embodiments, and a detailed description thereof will be omitted.

Referring to FIG. 20 C, according to an exemplary embodiment, a third mode (for example, a presentation mode) is provided. A third mode is a mode in which a content screen is displayed and includes an image received from an external source and a background image. Thus, when the electronic apparatus 100 is operating in the third mode, an effect is as if an image received from an external source is displayed on the wall behind the electronic apparatus 100 can be provided. In other words, a user may be deluded into thinking or observing that the image is displayed through the projector beam as opposed on a display of the electronic apparatus 100.

On the other hand, according to an exemplary embodiment, when the electronic apparatus 100 operates in the third mode, that is, when displaying a content screen including an image received from an external source and a background image, it is difficult for a user to perceive the heterogeneity between the electronic apparatus 100 and the actual background area when the difference of the brightness between the actual background area and the background image displayed on the electronic apparatus 100 is varied by little or is not significantly varied.

Accordingly, it is necessary to adaptively change the content screen including the background image displayed on the electronic apparatus 100 according to the change of the surrounding environment of the electronic apparatus 100.

Accordingly, the electronic apparatus 100 according to an exemplary embodiment senses a surrounding environment (for example, the external light), and processes and displays a content screen displayed in the electronic apparatus 100 according to the sensed surrounding environment.

Hereinbelow, the aforementioned operations, according to an exemplary embodiment, will be described in further detail with reference to a configuration of an electronic apparatus.

Figure 21:
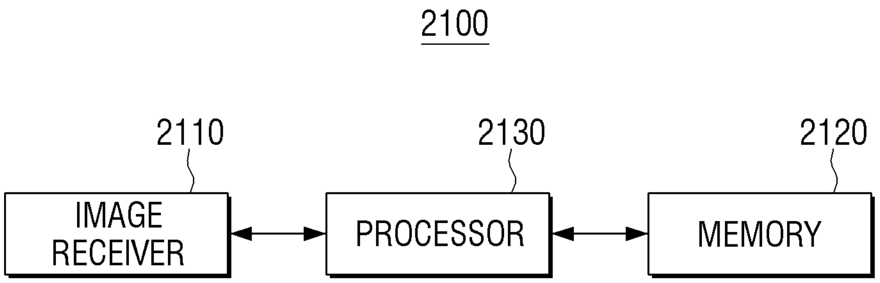
FIG. 21 is a block diagram illustrating a configuration of an electronic apparatus according to yet another exemplary embodiment.

FIG. 21 is a block diagram illustrating a configuration of an electronic apparatus according to another exemplary embodiment. Operations of an electronic apparatus 2100, according to an exemplary embodiment, will be described with reference to FIGS. 22 to 25B.

Referring to FIG. 21, the electronic apparatus 2100 includes an image receiver 2110, a memory 2120, and a processor 2130, according to an exemplary embodiment.

The image receiver 2110 can receive various images from an external source in a wired or wireless manner. Specifically, the image receiver 2110 can receive various images (for example, a broadcast content image, a photo content image, and the like) through a cable or an antenna from a broadcasting station or satellite.

The memory 2120 can store programs and data for controlling the electronic apparatus 2100. In particular, the memory 2120 may store data for the background image. According to an exemplary embodiment, data for the background image may be obtained from an external device (e.g., a smart phone, etc.), but this provided by way of an example only and not by way of a limitation and may be obtained from a camera connected to the electronic apparatus 2100.

The processor 2130 controls the overall operation of the electronic apparatus 2100. In particular, the processor 2130 may generate a content screen based on data for or about or related to the background image stored in the memory 2120 and data for or about or related to an image received from an external source while the electronic apparatus 2100 is operating in the third operation mode.

Specifically, according to an exemplary embodiment, the processor 2130 may generate a first layer (e.g., a content layer) that includes an image received from an external source based on data for an image received from an external source. The processor 2130 may then generate a second layer (e.g., a background image layer) containing the background image of the electronic apparatus 2100, based on the data for or about the background image stored in the memory 2120.

The processor 2130 may process the transparency of the first layer including the image received from the external source as the first transparency and the transparency of the second layer including the background image as the second transparency which is different from the first transparency.

Specifically, the processor 2130 can adjust the transparency of the first and second layers by adjusting the alpha values of the first and second layers. According to an exemplary embodiment, each alpha value can be between 0 and 1, a value of 0 means that the pixel of electronic apparatus 2100 has no coverage information is transparent/see through, and a value of 1 means that the pixel is opaque.

On the other hand, the transparency of the first and second layers can be preset in the electronic apparatus 2100. Specifically, according to an exemplary embodiment, the transparency of the first layer may be set to be lower than the transparency of the second layer in order to display an image received from an external source relatively clearly. For example, the transparency of the first layer may be set to 0.4, and the transparency of the second layer may be set to 0.6. However, exemplary embodiments are not limited thereto, and the transparency of the first and second layers may be variously adjusted according to a user command.

The processor 2130 can then generate a content screen in which the first layer including the image received from the external source and the second layer including the background image are superimposed.

Figure 22:
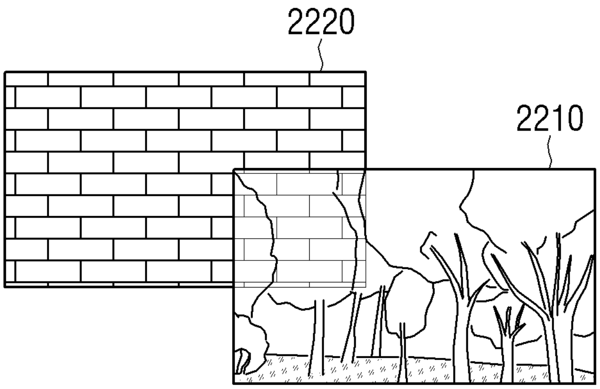
FIG. 22 is a view illustrating a first layer including an image received from an external source and a second layer including a background image according to an exemplary embodiment.

Referring to FIG. 22, the processor 2130 may generate a first layer 2210 including an image received from an external source, and a second layer 2220 including a background image. Then, the processor 2130 can create a content screen by superimposing the first layer 2210 on the second layer 2220, according to an exemplary embodiment.

In particular, when the first layer 2210 is overlaid on the second layer 2220, the processor 2130 may process the transparency of the first layer 2210 higher than the transparency of the second layer 2220. Thus, the processor 2130 processes the transparency of the first layer 2210 higher than the transparency of the second layer 2220, so that the user can be tricked into or can be deluded that the image received from the external source is displayed in the actual background area behind the electronic apparatus 2100. That is, there may be the effect as if an image received from an external source is projected onto an actual background area on the back side of the electronic apparatus 2100 i.e., on the actual space behind the electronic apparatus 2100.

However, the above is merely provided by way of an example and not by way of a limitation, and the processor 2130 may display the second layer 2220 in a superimposed manner on the first layer 2210 and may display the transparency of the second layer 2220 higher than that of the first layer 2210.

On the other hand, when the command for switching to the third mode is received while the electronic apparatus 2100 is operating in the first mode or the second mode, the processor 2130 may generate a content screen where the first layer including the image received from an external source and the second layer including a background image are overlaid.

Specifically, according to an exemplary embodiment, the processor 2130, while operating in one of the first mode for providing a first content screen including an image received from an external source and the second mode for providing a second content screen including a background image, when a mode switching command for operating the electronic apparatus 2100 in the third mode is received, may generate a content screen where the transparency of the first layer is processed as the first transparency, and the transparency of the second layer is processed as the second transparency.

On the other hand, when the electronic apparatus 2100 is operating in the second mode, when a background image and at least one graphic object are displayed together, when a command to switch to the third mode is received, the processor 2130 may remove at least one graphic object and display an image received from an external source on the display.

Specifically, in a state where the electronic apparatus 2100 displays a content screen including a first layer (that is, a background image layer) including a background image and an object layer including a graphic object on the display, when a command to switch to the third mode is received, the processor 2130 may remove the object layer, generate a second layer containing the image received from the external source, then superimpose the first and second layers, and then display the content screen including the first and second layers.

According to an exemplary embodiment, the command for switching a mode may be received from an external device (for example, a remote controller) and a physical key of the electronic apparatus 2100.

In this manner, according to an exemplary embodiment, the mode can be switched so that a user can set the desired operation mode more easily when the user wishes to view the general broadcast image using the electronic apparatus 2100, have an effect that the electronic apparatus 2100 looks like a glass window, or to have an effect as if the electronic apparatus 2100 functions as a presentation, a user is able to set the desired operation mode more easily.

On the other hand, there may be cases where the first layer including the image received from the external source is partially overlapped with the second layer due to the inconsistency of the resolution of the image received from the external source and the resolution of the electronic apparatus 2100.

Figure 23:
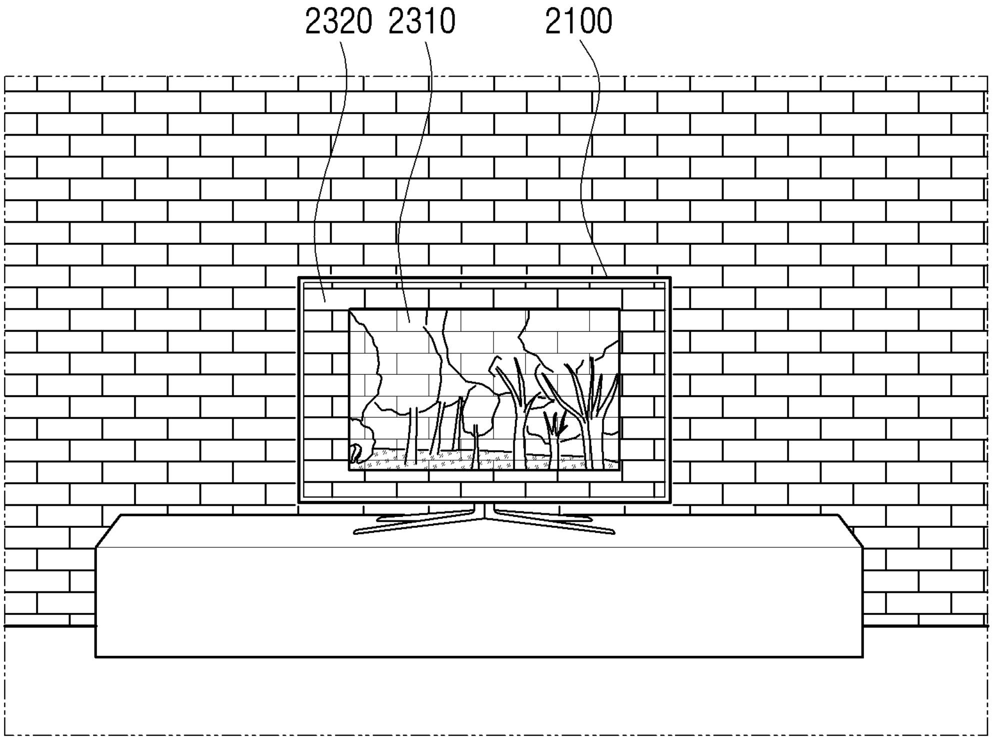
FIG. 23 is a view illustrating an operation of an electronic apparatus when an image received from an external source is partially overlapped on the second layer according to an exemplary embodiment.

For example, with reference to FIG. 23, according to an exemplary embodiment, if the resolution of the image received from the external source is less than the resolution of the electronic apparatus 2100, the image received from the external source may partially overlap the second layer.

According to an exemplary embodiment, when the transparency of the non-overlapping area of the second layer is processed to be higher than the transparency of the partially overlapped area or processed in the same manner, a user can feel a sense of heterogeneity between the electronic apparatus 2100 and the actual background area. Accordingly, it is necessary to process the transparency of the partially overlapping area of the second layer higher than the transparency of the non-overlapping area.

According to this necessity, the processor 2130 may adjust the transparency of the partially overlapping area to be higher than the transparency of the non-overlapping area in adjusting the transparency of the second layer.

Specifically, as shown in FIG. 23, according to an exemplary embodiment, when the first layer 2310 including the image received from the external source partially overlaps the second layer 2320, the processor 130 may process the partially overlapping area by adjusting the transparency of the first and second layers 2310 and 2320 in the same manner as described above and may adjust transparency of the remaining non-overlapping areas of the second layer 2320 to be lower than the transparency of the overlapped area. In this case, the processor 2130 may remove the heterogeneity between the electronic apparatus 2100 and the actual background area by adjusting the transparency of the non-overlapping area of the second layer 2320 to zero.

Meanwhile, in order to remove the sense of heterogeneity between the electronic apparatus 2100 and the actual background area, the color temperature or brightness of the second layer including the background image needs to be adjusted according to the external light incident on the electronic apparatus 2100.

To this end, according to an exemplary embodiment, the electronic apparatus 2100 may further include an illuminance sensor. According to an exemplary embodiment, the illuminance sensor can sense various environments around the electronic apparatus 2100. In particular, the illuminance sensor may sense at least one of the color temperature and illuminance of the external light source incident on the electronic apparatus 2100, and may generate sensed data including at least one of color temperature and brightness information.

According to an exemplary embodiment, the illuminance sensor is implemented as a single sensor, so that it can generate sensed data about or on the color temperature and brightness information of the external light, as well as a color sensor for sensing the ambient color temperature and illuminance to generate the respective sensing data.

Figure 24A:
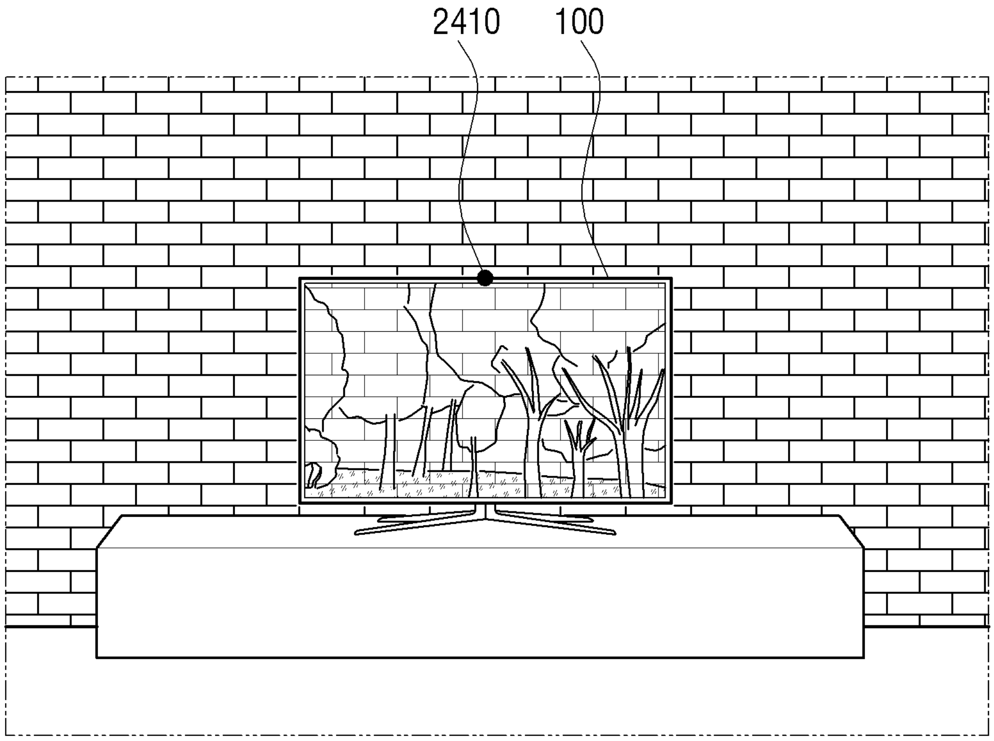
FIGS. 24A and 24B are views illustrating an electronic apparatus with a single illuminance sensor according to an exemplary embodiment.

For example, referring to FIG. 24A, according to an exemplary embodiment, the illuminance sensor 2410 is disposed in or located in one of the outer frames of the electronic apparatus 2100, and detects at least one of the direction in which the external light is incident on the electronic apparatus 2100, types of light, and illuminance, and generates sensing data thereof.

Based on at least one of the color temperature and the brightness information of the external light sensed by the illuminance sensor 2410, the processor 2130 may adjust at least one of the color temperature and brightness information of the second layer including the background image.

To be specific, the processor 2130 may adjust the color temperature value of the second layer by obtaining color temperature information of XYZ domain from the illuminance sensor 2410, converting the obtained color temperature information of the XYZ domain to RGB domain, and obtaining a gain value for correcting color temperature of pixels constituting the second layer based on the color temperature information.

In the similar manner, according to an exemplary embodiment, the processor 2130 may obtain the surrounding brightness information from the illuminance sensor 2410 and adjust the brightness value of the pixels constituting the second layer.

As described above, according to an exemplary embodiment, the processor 2130 may adjust at least one of the color temperature and brightness of the second layer by adjusting at least one of the color temperature value and the brightness value of the pixels constituting the second layer.

Figure 24B:
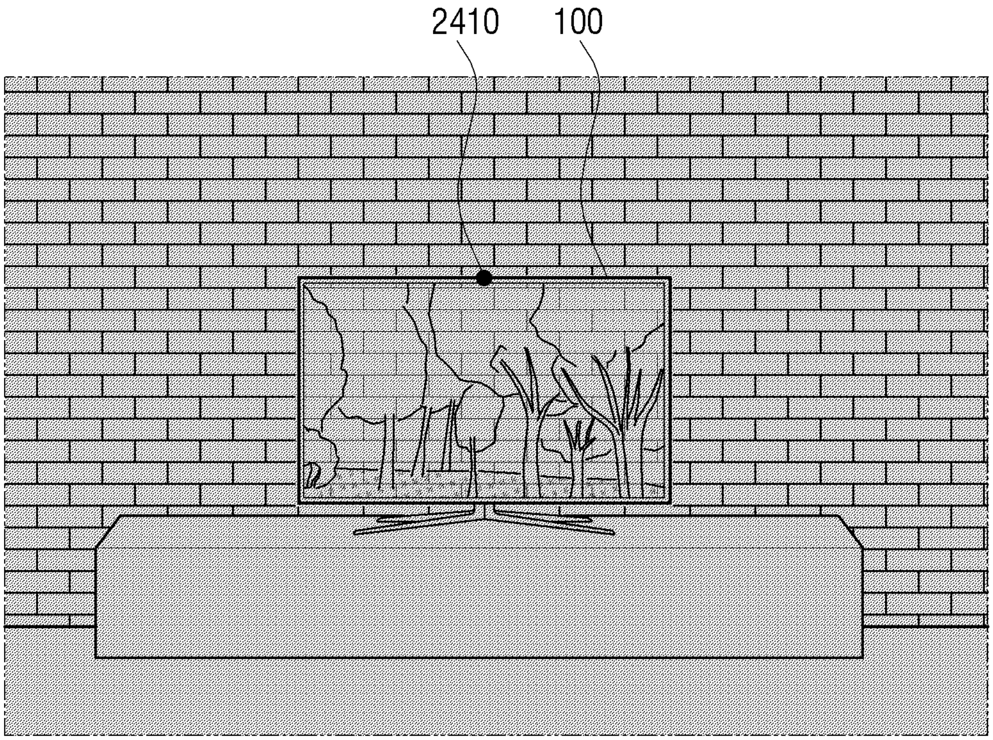

For example, referring to FIG. 24B, according to an exemplary embodiment, when it is determined that the brightness of the external light is dark based on the brightness information obtained from the illuminance sensor 2410, the processor 2130 may darken the entire brightness of the second layer. This has the effect of reducing the sense of heterogeneity between the actual background area behind the electronic apparatus 2100 and the background area of the screen displayed on the electronic apparatus 2100.

According to an exemplary embodiment, the electronic apparatus 2100 may further include a plurality of illuminance sensors.

Figure 25A:
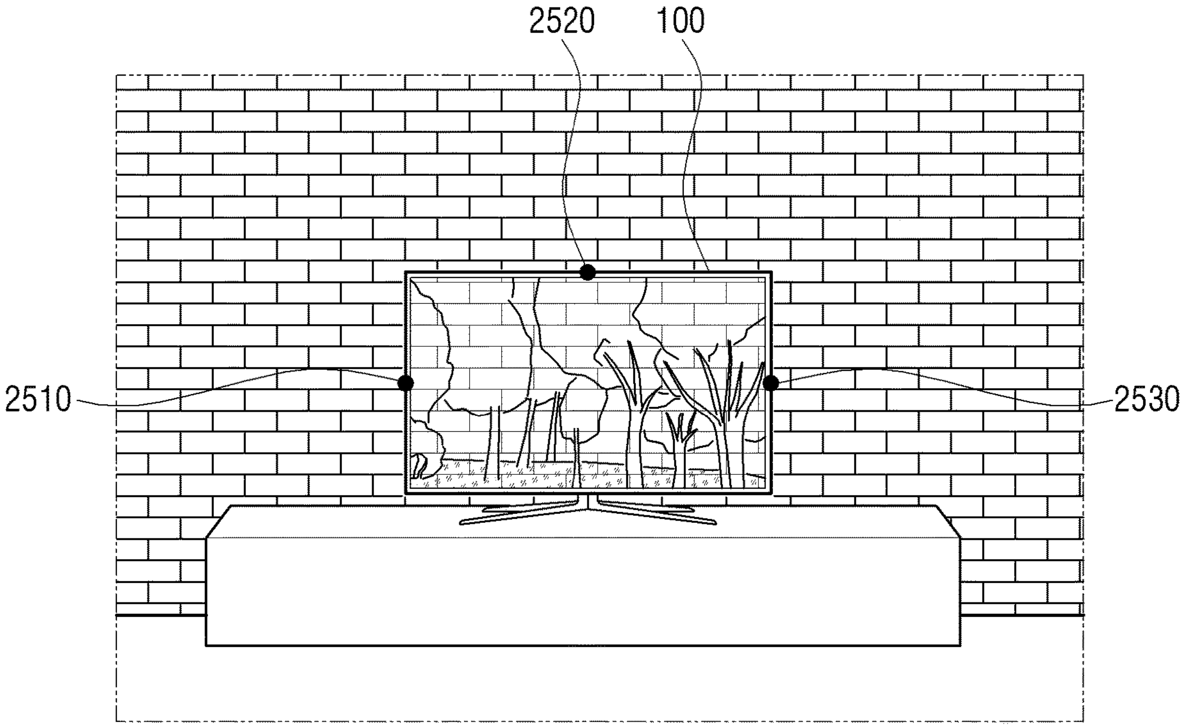
FIGS. 25A and 25B are views illustrating an operation of an electronic apparatus when an illuminance sensor is implemented as a plurality of sensors according to an exemplary embodiment.

For example, referring to FIG. 25A, a plurality of illuminance sensors may be respectively disposed in or located in a plurality of areas of an outer frame of the electronic apparatus 2100. Specifically, when three illuminance sensors are implemented, the first illuminance sensor 2510 may be disposed on or positioned in the left outer frame, the second illuminance sensor 2520 may be disposed on or positioned in the upper outer frame, and the third illuminance sensor 2530 may be disposed on or positioned in the right outer frame.

In this case, the processor 2130 may adjust the color temperature and brightness of the second layer by areas.

Specifically, the processor 2130 may obtain the color temperature information of the XYZ domain from each of the plurality of illuminance sensors, convert the color temperature information of the XYZ domain obtained from each of the plurality of illuminance sensors into the RGB domain, obtain gain values for correcting color temperature of the pixels constituting the second layer based on the position of a plurality of illuminance sensors and the color temperature information converted into RGB domain, to adjust the color temperature values of the second layer based on the obtained gain values.

Similarly, the processor 2130 may obtain the brightness information from each of the plurality of illuminance sensors, and adjust the brightness values of the pixels constituting the second layer on the basis of the plurality of illuminance sensor positions and brightness information.

Figure 25B:
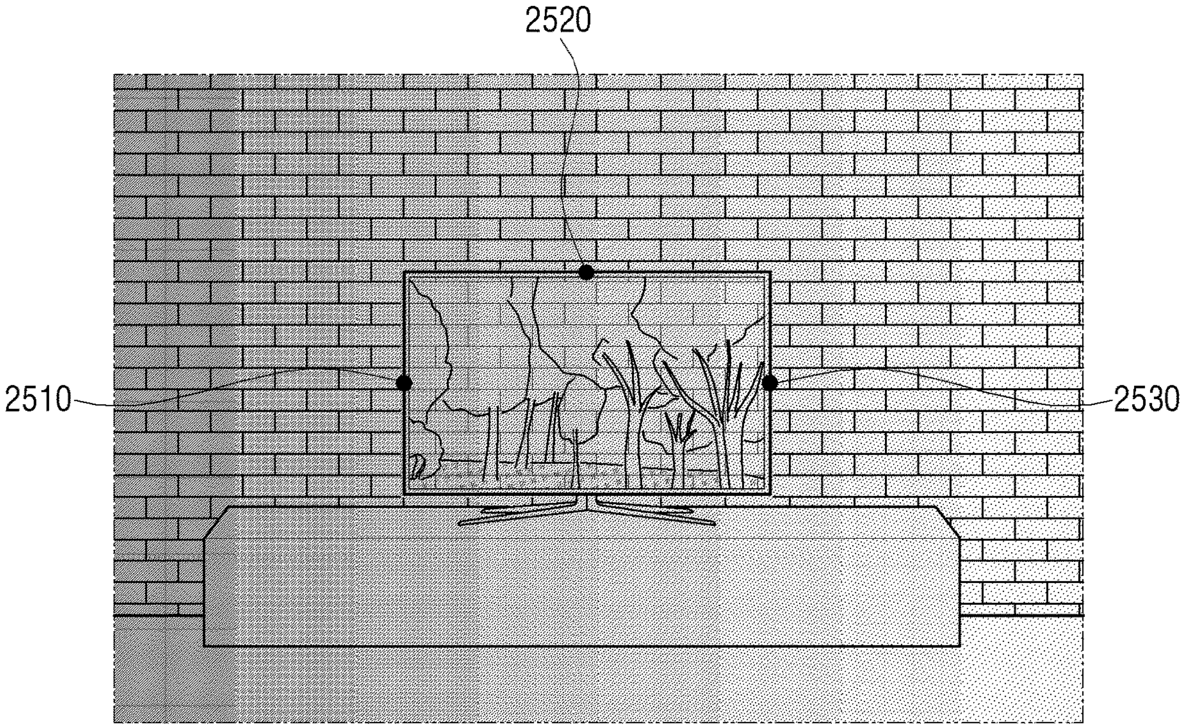

For example, referring to FIG. 25B, according to an exemplary embodiment, the processor 2130 can adjust the brightness of the content screen on an area-by-area basis based on the brightness information obtained from the plurality of illuminance sensors 2510, 2520, and 2530. Specifically, when the processor 2130 determines that the brightness sensed by the third illuminance sensor 2530 is higher than the brightness sensed by the second illuminance sensor 2520, and the brightness sensed by the second illuminance sensor 2520 is higher than the brightness of the first illuminance sensor 2510, the processor 2130 may darken the brightness of the second layer including the background image from an area where the third illuminance sensor 630 is located to an area where the first illuminance sensor 2510 is located.

According to an exemplary embodiment, in FIGS. 25A and 25B, the illuminance sensor is implemented by three illuminance sensors. However, the illuminance sensor may be implemented by two or four or more illuminance sensors. Although the case where the illuminance sensor is disposed in or located on the left, upper and right outer frames has been described, the illuminance sensor may be located in another area (for example, an edge area of the outer frame of the electronic apparatus 2100). These are provided by way of an example only and not by way of a limitation.

Meanwhile, the illuminance sensor described above can be embedded in the outer frame of the electronic apparatus 2100. In this case, since the illuminance sensor is not affected by the light emitted from the display of the electronic apparatus 2100, the color temperature and brightness of the external light can be more accurately detected.

On the other hand, if the color temperature and brightness of the second layer including the image received from the external source are changed according to the external light, the user may feel that the image has been altered from the viewpoint of the user who views the image. Accordingly, the color temperature and brightness of the second layer need to be kept constant regardless of the surrounding environment.

Accordingly, the processor 2130 can process the color temperature and brightness of the first layer including an image received from an external source to the color temperature and brightness set by a user regardless of the color temperature and brightness information of external light.

Specifically, the processor 2130 may adjust at least one of the color temperature and the brightness of the first layer based on the sensed data acquired from the illuminance sensor, and the color temperature and brightness of the second layer may be adjusted to the temperature and brightness which are set by a user. In addition, this is merely exemplary, and the processor 130 may maintain the color temperature and brightness of the second layer as the color temperature and brightness processed by the external source into the image.

Figure 26:
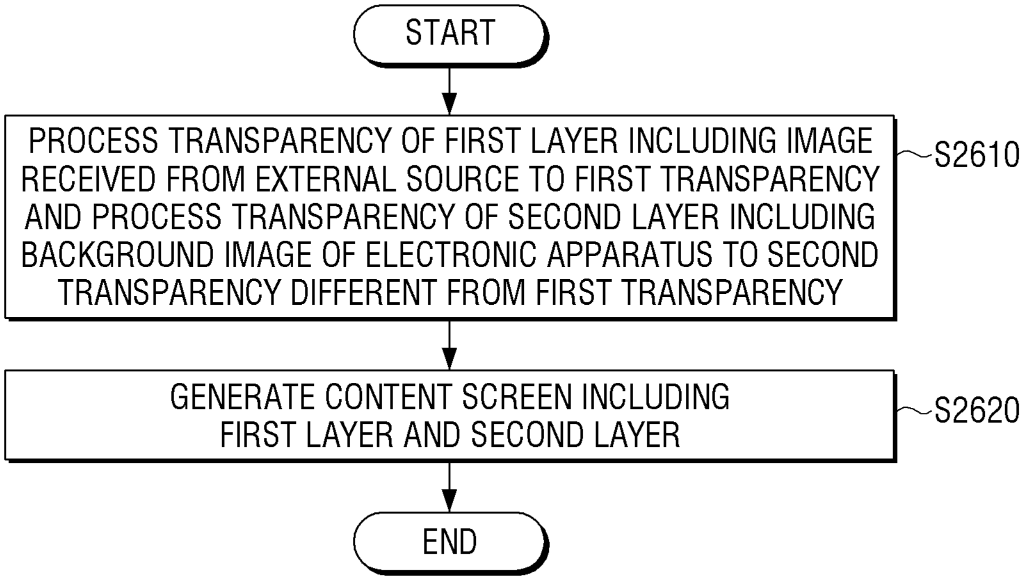
FIG. 26 is a flowchart to describe an operation of an electronic apparatus according to an exemplary embodiment.

FIG. 26 is a flowchart illustrating a method of operating an electronic apparatus according an exemplary embodiment.

According to an exemplary embodiment, the electronic apparatus 100 processes the transparency of the first layer including an image received from an external source to a first transparency, and processes the transparency of the second layer including a background image of the electronic apparatus to the second transparency, which is different from the first transparency (in operation S2610).

The electronic apparatus 100 generates a content screen including the first layer and the second layer (in operation S2620).

As described above, the electronic apparatus may sense at least one of color temperature and brightness according to the external light around the electronic apparatus and adjust at least one of the color temperature and brightness of the second layer.

The above-described methods according to various exemplary embodiments may be implemented as a software or application which is installable on the existing electronic apparatus.

The above-described methods according to various exemplary embodiments can be implemented by software upgrade of an existing electronic apparatus or hardware upgrade.

Also, the above-described various exemplary embodiments can be performed through an embedded server provided in an electronic apparatus, or a server outside of the electronic apparatus.

Meanwhile, the control method according to the various exemplary embodiments described above can be implemented by a program and provided to an electronic apparatus. In particular, a program containing a control method may be stored and provided in a non-transitory computer readable medium.

Non-transitory readable medium does not mean a medium that stores data for a short period of time such as a register, a cache, a memory, etc., but means a medium which semi-permanently stores data and can be read by a device. In particular, the various applications or programs described above may be stored and provided on the non-transitory readable media such as CD. DVD, hard disk, Blu-ray disk. USB, memory card, and ROM.

Exemplary embodiments have been described with reference to accompanying drawings. However, one of ordinary skill in the art will easily achieve many modifications and changes without departing from the spirit and scope of the present disclosure. Therefore, it is to be understood that the foregoing are illustrative exemplary embodiments and are not to be construed as limited to the specific exemplary embodiments. Modifications to exemplary embodiments, as well as other exemplary embodiments, are intended to be included within the scope of the appended claims and their equivalents.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims and their equivalents.

What is claimed is:

1. A method for controlling an electronic apparatus, the method comprising:

obtaining, through an illuminance sensor, a sensing value related to at least one of an illuminance of an external light and a color temperature of the external light;

generating a content screen comprising an object layer comprising at least one graphic object and a background image layer comprising a background image corresponding to an area behind the electronic apparatus;

displaying the content screen; and adjusting the background image of the displayed content screen based on the obtained sensing value or providing an image effect to the displayed content screen based on the obtained sensing value, wherein a transparency of the object layer is different from a transparency of the background image layer.

2. The method as claimed in claim 1, wherein the providing comprises:

identifying an illuminance value of the external light based on the sensing value and adding the image effect corresponding to the illuminance value to the content screen.

3. The method as claimed in claim 2, wherein the method further comprises:

generating an image effect layer including the image effect or adding the image effect to the object layer.

4. The method as claimed in claim 2, wherein the method further comprises:

identifying a direction of the external light based on the sensing value; and identifying a shape and a position of the image effect based on the identified direction of the external light.

5. The method as claimed in claim 2, wherein the method further comprises:

identifying ultraviolet rays value of the external light based on the sensing value;

identifying whether the external light is sunlight; and based on the external light being the sunlight, identifying whether to provide one of a flare effect and rainbow effect, as the image effect.

6. The method as claimed in claim 2, wherein the providing comprises:

adjusting a size and brightness of the image effect proportional to the illuminance value.

7. The method as claimed in claim 1, wherein the correcting comprises:

based on a change of an illuminance value being greater than or equal to a first value, increasing brightness of the content screen and reducing brightness thereafter.

8. The method as claimed in claim 7, wherein, based on the change of the illuminance value being greater than or equal to the first value while the content screen is displayed with a first brightness, increasing brightness of the content screen from the first brightness to a second brightness and reducing from the second brightness to the first brightness, within a predetermined time period, and wherein the second brightness is proportional to the change of the illuminance value.

9. The method as claimed in claim 8, wherein the adjusting comprises:

adjusting pixel brightness of the background image layer and the object layer included in the content screen and increasing or decreasing the brightness of the content screen thereafter, or adjusting a dimming value of backlight of the display and increasing or decreasing brightness of the content screen thereafter.

10. The method as claimed in claim 7, wherein the adjusting comprises:

based on the illuminance value of the external light being less than or equal to a second value, adjusting the brightness of the content screen to correspond to the illuminance value of the external light; and based on the illuminance value of the external light being maintained for a preset time and then the change of the illuminance value being sensed which is greater than or equal to the first value, increasing and then decreasing the brightness of the content screen.

11. The method as claimed in claim 7, wherein the method further comprises:

identifying a direction of the external light based on data from a plurality of illuminance sensors; and increasing the brightness of an area which corresponds to the identified direction of the external light, from among a plurality of areas of the content screen and reducing brightness thereafter.

12. The method as claimed in claim 1, wherein the illuminance sensor comprises a first illuminance sensor and a third illuminance sensor which are symmetrically positioned on a left side and a right side of a outer frame of the electronic apparatus, respectively, and a second illuminance sensor which is positioned on an upper side of the outer frame between the first illuminance sensor and the third illuminance sensor, wherein the adjusting comprises:

identifying color temperature information and brightness information of each of the external light which is incident on a plurality of areas of the outer frame via each of the first to third illuminance sensors; and correcting the color temperature and brightness of the content screen by areas from among the plurality of areas, based on the color temperature information and the brightness information.

13. The method as claimed in claim 12, wherein the first illuminance sensor is positioned at a center of the left side of the outer frame from among the outer frames, the second illuminance sensor is positioned at a center of an upper outer frame from among the outer frames, and the third illuminance sensor is positioned at a center of the right outer frame from among the outer frames.

14. The method as claimed in claim 12, wherein the adjusting comprises:

identifying color temperature information of XYZ domain from each of the first to third illuminance sensors;

converting the color temperature information of the XYZ domain obtained from each of the first to third sensors into an RGB domain;

obtaining a gain value which relates to a color temperature correction value of a pixel from among a plurality of pixels of the content screen, based on information about a position of the first to third illuminance sensors and the color temperature which is converted to the RGB domain; and correcting the color temperature value of the content screen by areas based on the obtained gain value.

15. The method as claimed in claim 12, wherein the adjusting comprises:

identifying brightness information from each of the first to third illuminance sensors;

obtaining reflectance ratio of an object which is located behind the electronic apparatus; and correcting brightness of the content screen on an area-by-area basis based on a position of the first to third sensors, the brightness information, and the reflectance ratio of the object.

16. The method as claimed in claim 12, wherein the content screen further comprises a shadow layer between the object layer and the background image layer, wherein the method further comprises:

identifying a direction of the external light based on data obtained from the first to third illuminance sensors; and generating a shadow of the object forming the shadow layer, based on the determined direction.

17. A method for controlling an electronic apparatus, the method comprising:

obtaining, through an illuminance sensor, a sensing value related to at least one of an illuminance of an external light and a color temperature of the external light;

generating a content screen comprising an object layer comprising at least one graphic object and a background image layer comprising a background image corresponding to an area behind the electronic apparatus;

displaying the content screen; and correcting the background image based on the obtained sensing value or providing an image effect to the content screen based on the obtained sensing value, wherein, based on a predefined user command being input while the content screen is displayed, identifying a transparency of a first layer as a first transparency, identifying the transparency of a second layer as a second transparency, which is different from the first transparency, and generating a new content screen comprising the first layer comprising an image received from an external source and a second layer comprising the background image.

18. The method as claimed in claim 17, wherein, based on the first layer being overlaid with the second layer, processing the first transparency to be higher than the second transparency.

19. The method as claimed in claim 17, wherein, based on the first layer being partially overlapped the second layer, adjusting the transparency of a partially overlapped area to be higher than the transparency of a non-overlapped area.

20. A non-transitory computer-readable recording medium storing a program for executing a method for controlling an electronic apparatus, wherein the method comprises:

obtaining a background image corresponding to an area behind a display apparatus, the background image being obtained by photographing the area behind the display apparatus, or by receiving from an external apparatus; and transmitting the background image to the display apparatus for displaying a content screen comprising an object layer comprising at least one graphic object and a background image layer comprising the background image, wherein the background image of the content screen displayed on the display apparatus is adjusted based on a sensing value related to at least one of an illuminance of an external light and a color temperature of the external light, and wherein a transparency of the object layer is different from a transparency of the background image layer.

* * * * *